United States Patent [19]
Gonion et al.

[11] Patent Number: 6,094,726
[45] Date of Patent: Jul. 25, 2000

[54] DIGITAL SIGNAL PROCESSOR USING A RECONFIGURABLE ARRAY OF MACROCELLS

[75] Inventors: Jeffry E. Gonion; Brett C. Bilbrey, both of Palatine, Ill.

[73] Assignee: George S. Sheng, Mountainview, Calif.

[21] Appl. No.: 09/019,134

[22] Filed: Feb. 5, 1998

[51] Int. Cl.⁷ .................................................. G06F 1/12
[52] U.S. Cl. .................... 713/400; 712/221; 712/242; 714/731
[58] Field of Search ...................... 713/400, 401, 713/500, 501, 600; 714/734, 12, 724, 725, 731; 712/1, 10, 11, 201, 203, 221, 222, 223, 242; 365/233.5, 233; 360/77.04; 358/20; 327/144; 708/230, 236; 710/25, 118

[56] References Cited

U.S. PATENT DOCUMENTS

| | | | |
|---|---|---|---|
| 4,140,921 | 2/1979 | Balasubramanian et al. | 307/208 |
| 4,542,508 | 9/1985 | Moore | 714/734 |
| 4,937,770 | 6/1990 | Samuels et al. | 364/578 |
| 5,130,785 | 7/1992 | Jang et al. | 358/20 |
| 5,194,832 | 3/1993 | Iga | 333/18 |
| 5,222,035 | 6/1993 | Nakase et al. | 708/318 |
| 5,450,608 | 9/1995 | Steele | 712/1 |
| 5,487,023 | 1/1996 | Seckora | 708/315 |
| 5,521,773 | 5/1996 | Suzuki et al. | 360/77.04 |
| 5,731,770 | 3/1998 | Minoda | 341/61 |
| 5,815,462 | 9/1998 | Konishi et al. | 365/233 |
| 5,877,718 | 3/1999 | Andoh et al. | 341/115 |
| 5,886,949 | 3/1999 | Villa et al. | 365/233.5 |
| 5,912,572 | 6/1999 | Graf, III | 327/144 |

Primary Examiner—Joseph E. Palys
Assistant Examiner—Rijue Mai
Attorney, Agent, or Firm—Foley & Lardner

[57] ABSTRACT

A real time digital systolic processor with a core of reconfigurable interconnected macrocells which can be programmed according to function for processing high bandwidth digital data. Each macrocell contains arithmetic logic units for performing predetermined functions based on format of the input data stream from an outside source or from other macrocells. The interconnects between each macrocell are arranged so that the function of the device is predetermined according to user specific applications.

22 Claims, 7 Drawing Sheets

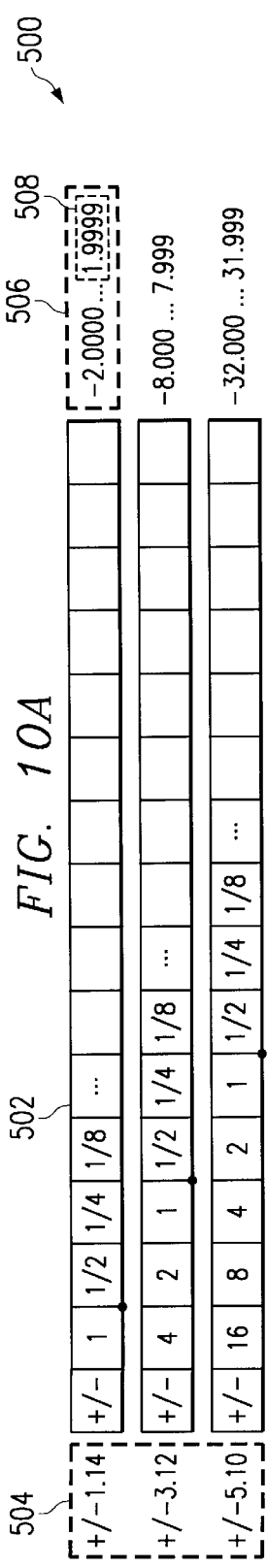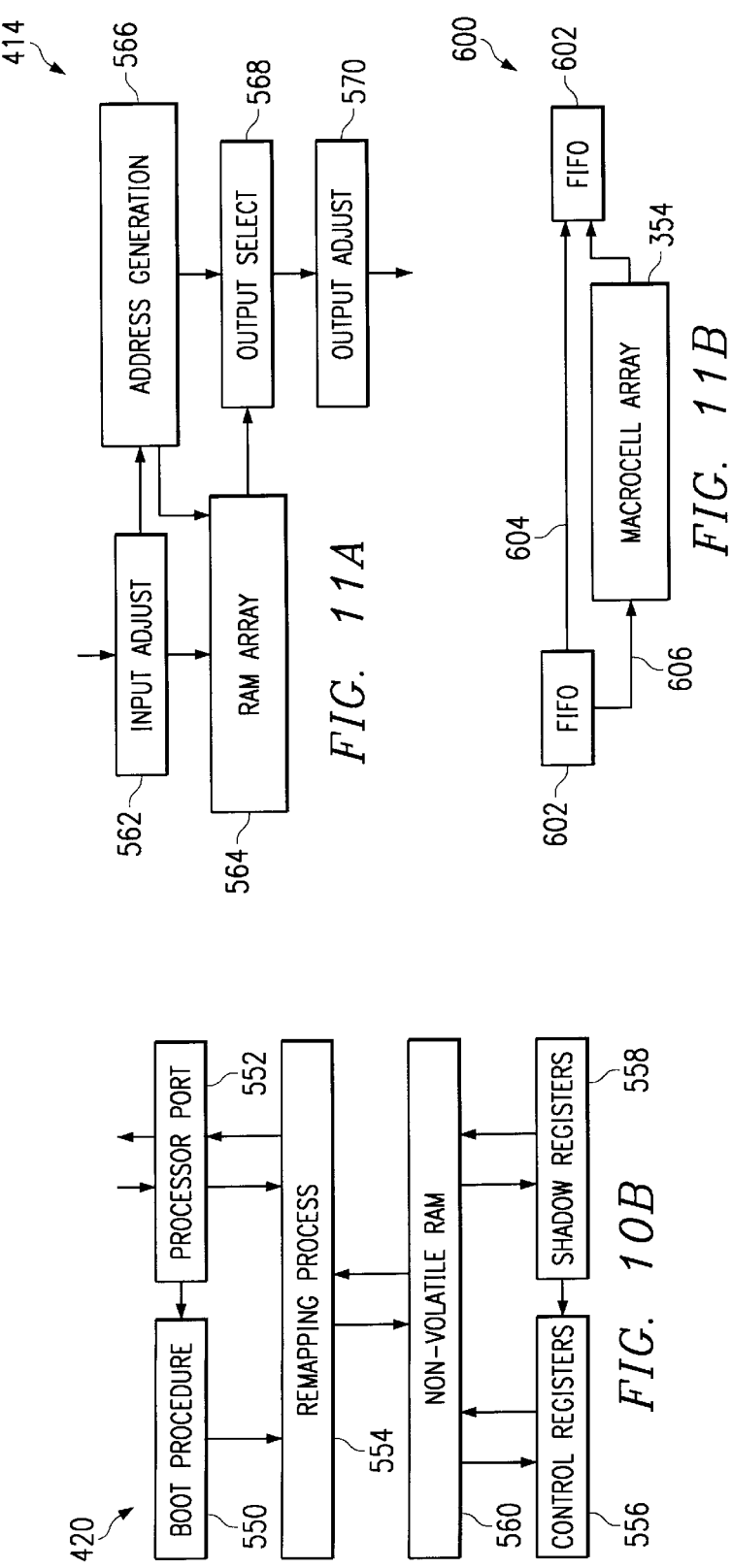

DIGITAL SIGNAL PROCESSOR USING A RECONFIGURABLE ARRAY OF MACROCELLS

The present invention relates generally to digital signal processing, and more particularly, to a real time digital systolic processor with a core of reconfigurable interconnected macrocells which can be programmed according to function for processing high bandwidth digital data.

BACKGROUND

Advances in semiconductor processing, design and device performance coupled with dramatic reductions in manufacturing costs have created opportunities for digital technologies to invade new and previously unrelated industries. For example, in the signal processing arena, a shift is underway from analog media, such as composite television signals, to precisely calculated digital representations like high-definition TV and compact discs. As a result, a premium has been placed on the underlying hardware systems that format, manipulate, transmit and resolve such signals.

Digital data, in particular picture images, such as GIF, JPEG and MPEG images, video images for film industry, video images for video games, etc., must be processed on the order of microseconds in order to appear as a "real time image" to the viewer. Interactive enhanced-definition televisions may have decoder boxes for broadcast on demand in the home. Digitally compressed cable television systems will offer ten times the number of current channels. On-line access to databases, video games and libraries through personal computers, cable lines and telephone will dramatically enhance availability of information.

Digital Signal Processors ("DSPs") and Field Programmable Gate Arrays ("FPGA") are typical of the types of devices being used for processing digitally encoded signals. DSPs are designed to process information in real time using built in computational units. A DSP is arranged to decrease processing time by limiting execution of complicated procedures in the control application software instructions and spending most of the processing resources on resolving, decoding and communicating the incoming digital signal. The DSP is considered to be a suitable "real time" signal processor for most applications, but may be unsuitable as a general purpose real time signal processor for many of today's highly complex digital signal patterns. For high bandwidth signals, such as uncompressed video, a DSP is often inadequate.

On the other hand, a FPGA is a versatile integrated circuit chip which often includes an array of identical logic blocks. The internal circuitry of a FPGA can be configured by an individual user to realize an application specific integrated circuit ("ASIC"). During configuration, the user specifies the on-chip interconnect structure of the FPGA. The resulting arrangement is a logic circuit that is suited for a given task or function. The core logic, however, remains the same regardless of its application, resulting in a device with less than ideal performance characteristics in terms of efficiency and throughput. Thus, although FPGAs are flexible as programmable application driven devices, they lack the efficiency and processing speed required to handle complex image processing algorithms.

An integrated circuit architecture that can be configured at the mathematical operation level (addition/subtraction/multiplication/comparison) rather than at the boolean logic level (and/or/xor/invert) would provide tremendous advantages over prior art DSP and FPGA technologies. FPGAs are made up of thousands or hundreds of thousands of cells programmed or configured at the gate level using basic and/or boolean logic circuits. This means that a single multiplication operation can represent thousands of boolean operations. With a FPGA, mathematical constructs are not built in for efficiency since it is intended to provide a general purpose logic processor. Many of today's video and digital data standards require high degrees of resolution and on-the-fly reconfigurability. In image processing, for example, the image itself may be a two dimensional array of values called pixels. Current DSP and FPGA technologies, however, are two slow or consume undesirable amounts of circuitry to achieve real time processing of the incoming data stream. As data throughput demands continue to increase, the need for more flexible device architectures also increases. One approach is to couple core logics into parallel arrangements for processing the data in piece-meal fashion. Systems employing parallel processing techniques present obstacles to systems operators due to complexities inherent in configuration, setup and interface to outside systems. Parallel processors are often difficult to configure and require specialized knowledge both at the devices and system level to achieve smooth interoperability with external subsystems.

What is needed is a device architecture that provides the real time signal processing capability with internal reconfigurability functions suitable for handling today's high bandwidth digital signal formats such as compressed video, audio, compact disk, digital versatile disc and mixed mode, among others.

SUMMARY OF THE INVENTION

Accordingly, the present invention provides a reconfigurable real time digital processor comprising of a user determined set of interconnected macrocells operating in conjunction to perform real time systolic processing of digital data. Interconnections between macrocells are programmable so that the user defined set of macrocells may be utilized to perform user specified functions or task.

In one embodiment, a systolic processor with an internal macrocell section having a set of input ports for processing streams of incoming digital data is provided. The macrocell section comprises a memory block used for equalizing incoming streams of digital data, and a control circuit made up of flip flops, multiplexers and other standard logic devices for dividing the incoming stream into an array of four unique output streams.

In another embodiment, the macrocell contains at least one set of output ports for delivering digital signals received from the equalization block following processing by arithmetic units contained in the macrocell. A set of universal memory registers are used by in-bound control circuits to control actions of the macrocell according to predetermined configured functions.

In another embodiment, the macrocell section contains a plurality of arithmetic logic units and input ports are used for selecting data inputs from a unique set of available digital data streams received from the macrocell section. The macrocell section can incorporate at least two adders which selectively perform arithmetic operations on the incoming digital data. A multiplier is also used to perform a selective set of multiplicative operations on the data stream. Together, the adders and multiplier achieve a pre-configured function using a set of configuration registers. A set of output ports are coupled to the macrocell section for interfacing successive macrocells to each other.

In still another embodiment, a support block may be coupled to the interconnected macrocells and arranged as an interface between the processor defined by the particular arrangement of macrocells and one or more external systems. At least one of external systems is capable of writing to macrocell memory registers for configuring the processor according to user selected functions. An input block and an output block are also provided for receiving digital data from the outside subsystems and transmitting them, after processing, to the external systems.

Still other advantages and benefits of the invention will be understood by reference to the following detailed description taken in conjunction with the attached drawings.

BRIEF DESCRIPTION OF THE DRAWINGS

In the drawings:

FIG. 10a illustrates the data structure that the MSIC supports in one embodiment of the invention;

FIG. 10b is a flow diagram representing the operation process of the processor interface of an MSIC according to one embodiment of the invention;

FIG. 11a represents the flow process through a RAM block of an MSIC according to one embodiment of invention; and FIG. 11b illustrates how data handling problems associated with the macrocells is handled according to one embodiment of the invention.

DETAILED DESCRIPTION

Figure 1:
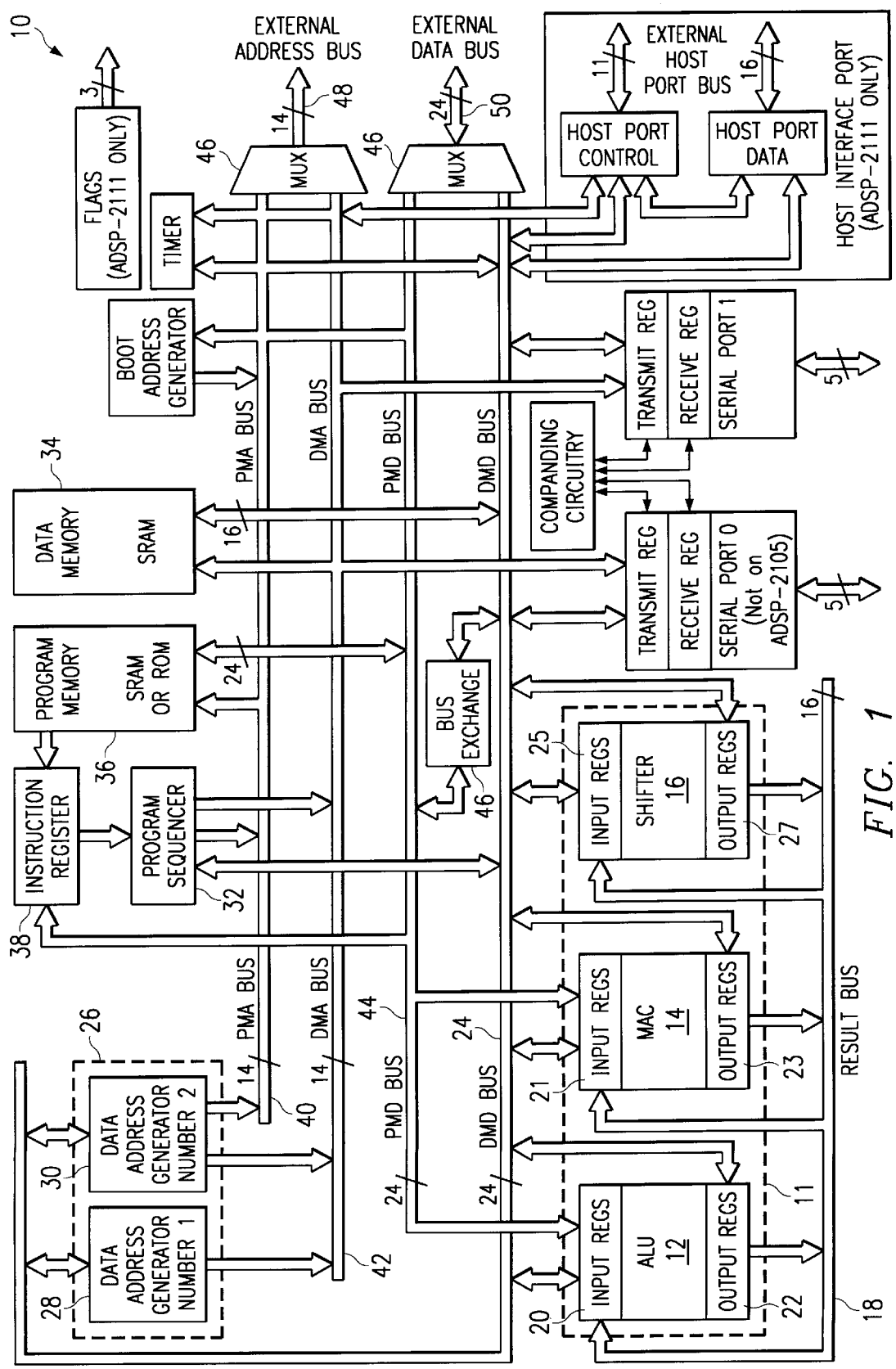
FIG. 1 is a high level depiction of the internal architecture of a prior art Digital Signal Processor ("DSP")

Turning to FIG. 1, a high level architectural diagram of a standard Digital Signal Processor ("DSP") is shown and denoted generally as 10. DSP 10 has three independent, full-function computational units 11 including an arithmetic/logic unit ("ALU") 12, multiplier/accumulator ("MAC") 14 and barrel shifter 16. All of the computational units 11 are capable of processing 16-bit data directly and also provide hardware support for multi-precision computation.

The ALU 12 performs a standard set of arithmetic and logic operations in addition to division primitives. The MAC 14 performs single-cycle multiply, multiply/add, and multiply/subtract operations. The shifter 16 performs logical and arithmetic shifts, normalization, de-normalization, and derive-exponent operations. The shifter 16 also implements numeric format control including multi-word floating-point representations. In order to have the output of any unit capable of being the input of any unit on the next cycle the computational units 11 are arranged side-by-side instead of serially. Such a connection between the computational units 11 is possible via the internal result bus 18. Computational units 11 contain input registers 20 and output registers 22 which are accessible from the internal data memory data (DMD) bus 24.

Computational operations generally take their operands from input registers and load the result into an output register. The registers act as a stop-over point for data between memory and the computational circuitry. This feature introduces one level of pipelining on input, and one level on output. Internal result bus 18 allows the result of a previous computation to be used directly as the input to another computation. This avoids excessive pipeline delays when a series of different operations are performed.

Addresses for on-chip or external memory access are supplied by two dedicated data address generators (DAGs) 26 and a program sequencer 32. The DAGs 26 provide memory addresses when memory data is transferred to or from the input or output registers of the computational units 11. By using dual data address generators 26 the processor is allowed to generate simultaneous addresses for dual operand fetches. DAG 28 can supply addresses to data memory 34 only, while DAG 30 can supply addresses to either data memory 34 or program memory 36.

The program sequencer 32 acts to maintain proper control of program flow and together with the data address generators 26 keeps the computational units 11 continuously working and maximizes throughput. The program sequencer 32 supplies instruction addresses to the program memory 36 and is driven by the instruction register 38 which holds the currently executing instruction.

Instruction register 38 introduces a single level of pipelining into the program flow such that the instructions are fetched and loaded into the instruction register 38 during one processor cycle and executed during the following cycle while the next instruction is being pre-fetched. Furthermore, the program sequencer 32 also supports single-cycle conditional branching and executes program loops with zero overhead.

The generic DSP described may have five internal buses. The program memory address ("PMA") 40 and data memory address ("DMA") 42 buses are used internally for the addresses associated with the program and data memory, while the program memory data ("PMD") 44 and data memory data ("DMD") buses 24 are used for the data associated with the memory spaces. These buses are multiplexed 46 into a single external address bus 48 and a single external data bus 50.

The PMA bus 40 is 14 bits wide and allows direct access of up to 16K words of mixed instruction code and data. The PMD bus 44 is 24 bits wide and can accommodate a 24-bit instruction width. Meanwhile, the DMA bus 42 is 14 bits wide and allows direct access of up to 16K words of data. Likewise the DMD bus 24 is 16 bits wide, and provides a path for the contents of any register in the processor to be transferred to any other register or to any data memory location in a single cycle. The PMD bus 44 can also be used to transfer data to and from the computational units 11 through direct paths or via the bus exchange unit 46. As mentioned previously, the internal result bus 18 transfers intermediate results directly between the various computational units.

A DSP 10 must provide single-cycle computation for multiplication, multiplication with accumulation, arbitrary amounts of shifting, and standard arithmetic and logic operations. The ALU 12 must allow for any sequence of computations so that a given DSP algorithm can be executed without reformulation. Thus, the DSP 10 provides internally for compiled compact multiplier functions for performing various arithmetic functions.

The DSP 10 is limited in bandwidth since it doesn't perform systolic operations for signal processing at high rates of speed primarily because single processor is performing all operations on the incoming data stream. Moreover, since most DSPs use interface circuitry, the incoming data stream must be received and stored prior to processing. After processing, the result is written onto a bus, memory space or other internal architecture where it can be communicated to a downstream device. Due to its lack of systolic processing, the DSP must be interfaced to the incoming data stream with additional circuitry.

Figure 2:
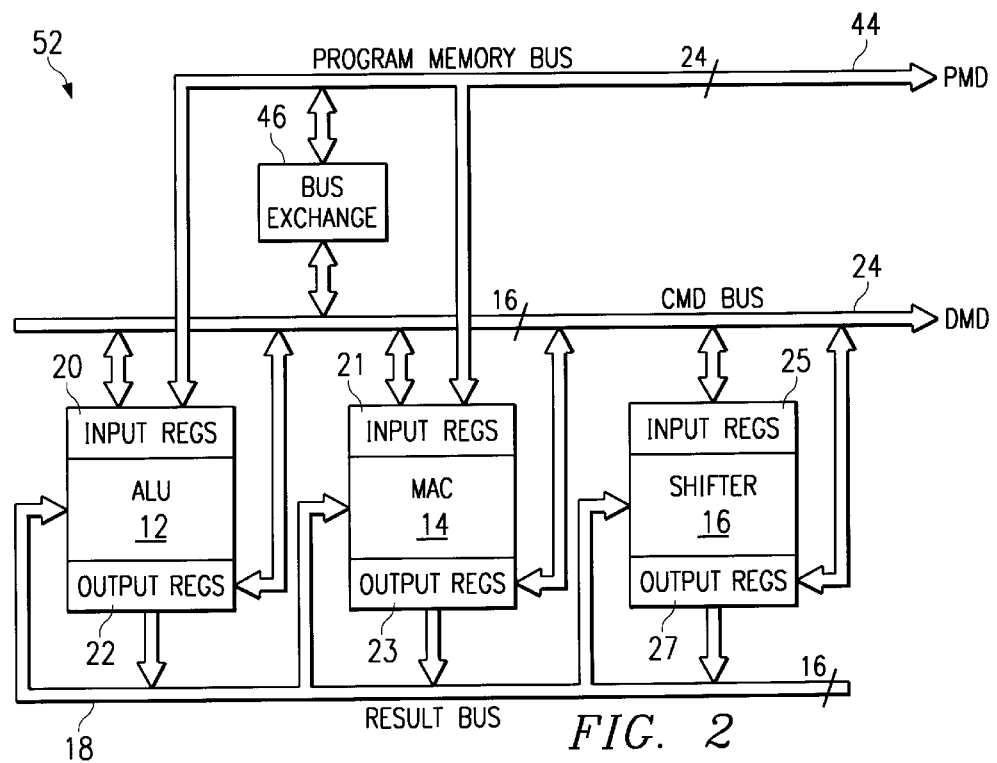
FIG. 2 is a high level depiction illustrating the data architecture of the DSP shown in FIG. 1.

Referring now to FIG. 2, the design limitations of a DSP are illustrated with the high level block diagram 52. As mentioned, the arithmetic section of DSP 10 contains three independent computational units: the ALU 12, the MAC 14, and barrel shifter 16. These three units are connected via an internal result bus 18 so as to allow the output of one unit to be used as the input to another. Furthermore the ALU 12 and MAC 14 have direct connections to the program and data memory buses.

For DSP 10, the MAC result register 23 is a 40-bit accumulator which is divided into two 16-bit pieces and an 8-bit overflow register. This 8-bit overflow register allows for 256 MAC 14 overflows before a loss of data can occur. This is important as DSP applications frequently deal with numbers over large dynamic ranges.

The disadvantages of DSP 10 inherent with computational processing units 50 is the reduced processing speed for dynamic video signals. DSPs are not considered "real time" for some applications, such as video images for the film industry. This is a result primarily of the serial arrangement of the computational units 12, 14, and 16, which limit overall system bandwidth. Moreover, a DSP does not handle systolic operations, nor process signals, that come in at a high rate of speed. The configuration and addressing techniques used with most DSPs 10 mean that incoming signals are buffered prior to processing, requiring additional amounts of interface circuitry for hand-off to other subsystems.

Figure 3:
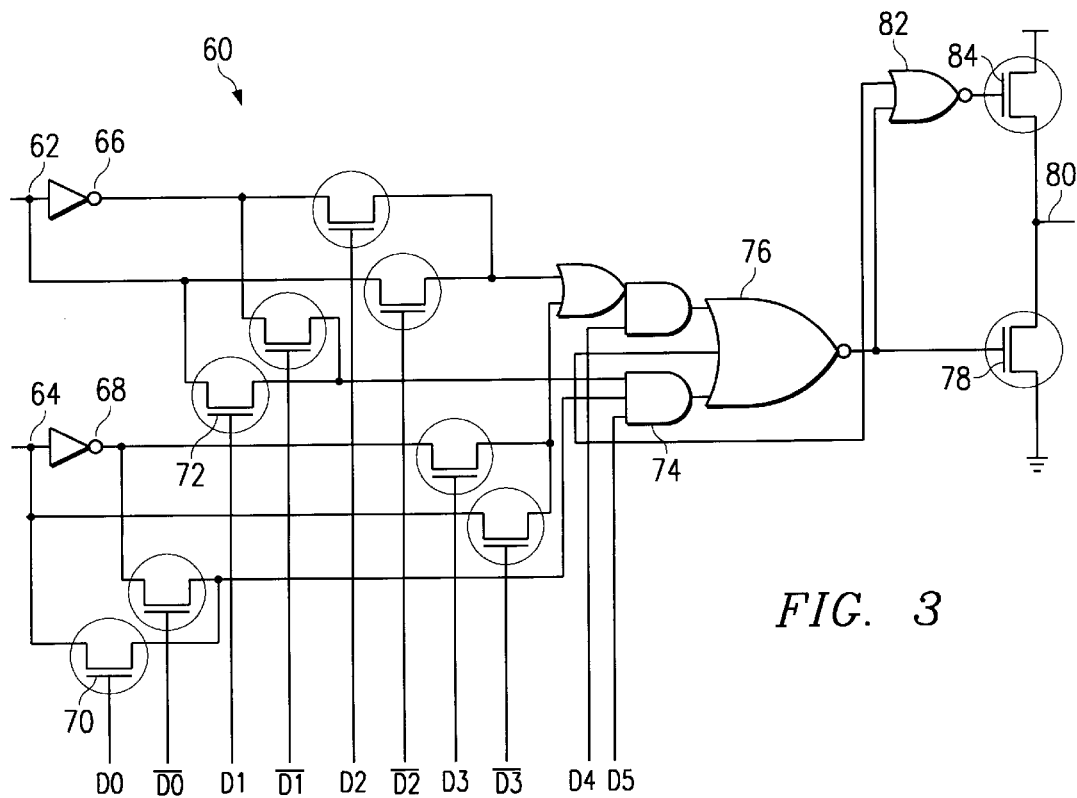
FIG. 3 is a schematic drawing exemplary of a single macrocell in a Field Programmable Gate Array ("FPGA")

Turning now to FIG. 3, a schematic drawing exemplary of a single cell in a Field Programmable Gate Array ("FPGA") is illustrated and denoted generally as 60. More specifically, FIG. 3 illustrates the logic structure of one possible arrangement of an FPGA capable of implementing all useful functions of the input variable 62 and input variable 64, with the functions being selected by configuration control signals D0, $\overline{D0}$, D1, $\overline{D1}$, . . . through D5.

For example, to implement an AND gate, input leads 62 and 64 are shunted past invertors 66 and 68, respectively, by high level signals on the D1 and D0 configuration control leads. Leads D1 and D0 are connected to well-known pass transistors 70 and 72. Low level signals are applied to the configuration control leads D0, D1, D4. Assuming that D0, D1 and all of the other leads are connected to N channel MOS pass transistors, the control signals D2, $\overline{D2}$; D3 and $\overline{D3}$ are "don't cares". That is, these signals can be high or low without affecting the output signal 80. In addition, a high level signal on D5 is applied to enable AND gate 74. Thus AND gate 74 serves as a two input AND gate providing to NOR gate 76 the logical AND of input variables 62 and 64. The signal from AND gate 74 is passed through NOR gate 76.

NOR gate 76 converts the high level signal from AND gate 74 to a low level signal to turn off MOS transistor 78 (the source of which is grounded and the drain of which is connected to the output lead 80) and to turn on through NOR gate 82 N channel transistor 84 (the drain of which is connected to a power supply and the source of which is connected to both the output lead 80 and the drain of N channel transistor 78). Thus the structure configured as described above is an AND gate. Other logic functions can also be produced by appropriate selection of the control signal to be supplied to the configuration control leads D0 through D5 to activate the appropriate pass transistors and gates within the structure.

FPGAs are typically produced by interconnecting a plurality of active devices made up of logical elements, such as the multipurpose circuit just discussed, in a base array in any one of a number of ways to achieve a desired logic function. As gate arrays become more complex, the simulation of the logic to be achieved from a given interconnection of the active devices in the base array becomes more difficult and is typically carried out using a computer program. The layout of the actual interconnections for the active devices in the base array to yield a finished gate array is then derived using a computer aided design program of a type well known in the art. The process of designing such a structure is complex and reasonably expensive requiring the use of logic simulation and verification programs and semiconductor device layout programs.

The logic circuitry described above is a small cell of a FPGA. This could become a complex network of circuitry when the application the FPGA is designed for becomes complex, such as image processing. As these cells become more complex the number of resources that are dedicated to data path routing in an FPGA become far too great. Image processing requires extensive functions and a fast response time which the FPGA can not provide. Accordingly, a need exists for an alternative approach which significantly simplifies the obtaining of a given logic function from a base array of cells.

Figure 4:
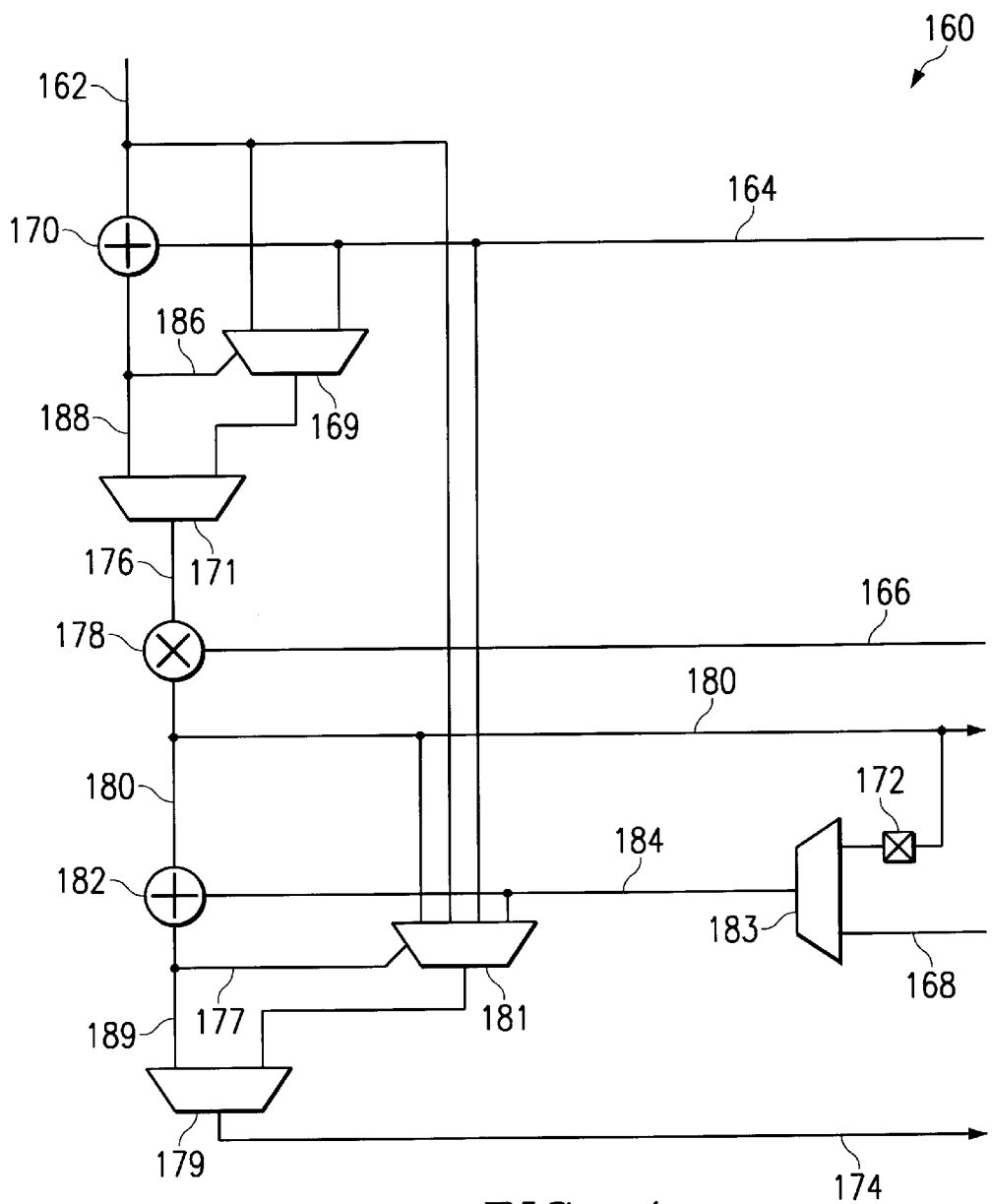
FIG. 4 is a high level architectural diagram of a macrocell according to one embodiment of the invention.

Turning to FIG. 4, a high level architecture of a macrocell according to the invention is shown and denoted generally as 160. The macrocell 160 can be used as the functional backbone of a reconfigurable logic device. Macrocell 160 can be configured to perform two additions and one multiply for each pixel, effectively providing double the amount of processing that could otherwise be accomplished using prior art devices. Conditional expressions can be implemented, and the timing of incoming video signals is automatically corrected to allow processing to be carried out appropriately.

The routing structures near adder 170 are comprised of multiplexers 169 and 171. Sign bit 186 of the addition result 188 drives the select line of multiplexer 169 controlling the selection process between adder input 162 and 164. This can be used, for example, to calculate min/max information. Thus, input 162 and input 164 to the adder 170 are subtracted and the proper input from multiplexer 169 is selected based on the sign 186 of the subtraction result 188. The routing structures near adder 182 comprised of multiplexers 179, 181. Sign bit 177 of addition result 189 drives the select line of multiplexer 181 controlling the selection process between multiplier result 180, input 162, input 164, or multiplexer result 184. The multiplier result 180 can be delayed 172 and fed into the second adder 182 as another input stream 184. This allows data on two subsequent clock phases or pixels to be operated on together.

Incoming input stream 162 is added 170 to a second stream 164, which may also be a constant. The result 176 from multiplexer 171 is then multiplied 178 by a third stream or constant 166. Finally that result 180 is added 182 to a fourth stream 184 which may also be a constant. The fourth stream 184 may be the multiplier result 180 delayed by one or two clock phases 172 or input 168. Multiplexer 183 is the control circuitry used to select from multiplier result 180 or input 168 with each clock phase. The final stage is from multiplexer 179 selection of adder result 189 or multiplexer 181 result. The outputs from macrocell 160 are a multiplication result stream 180 and a addition result stream 174.

Figure 5:
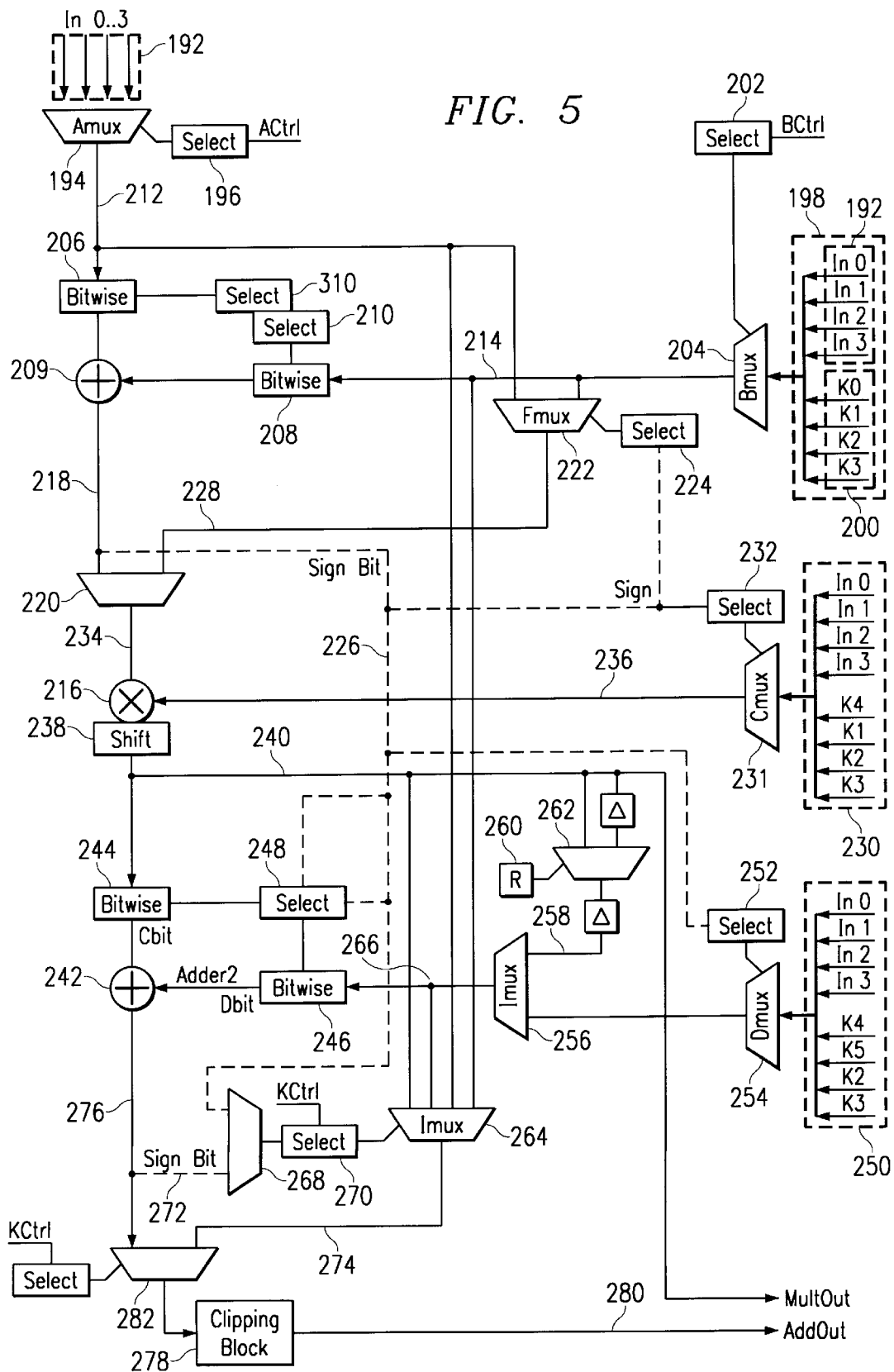
FIG. 5 is a detailed circuit diagram of a first macrocell section according to one embodiment of the invention.
Figure 6:
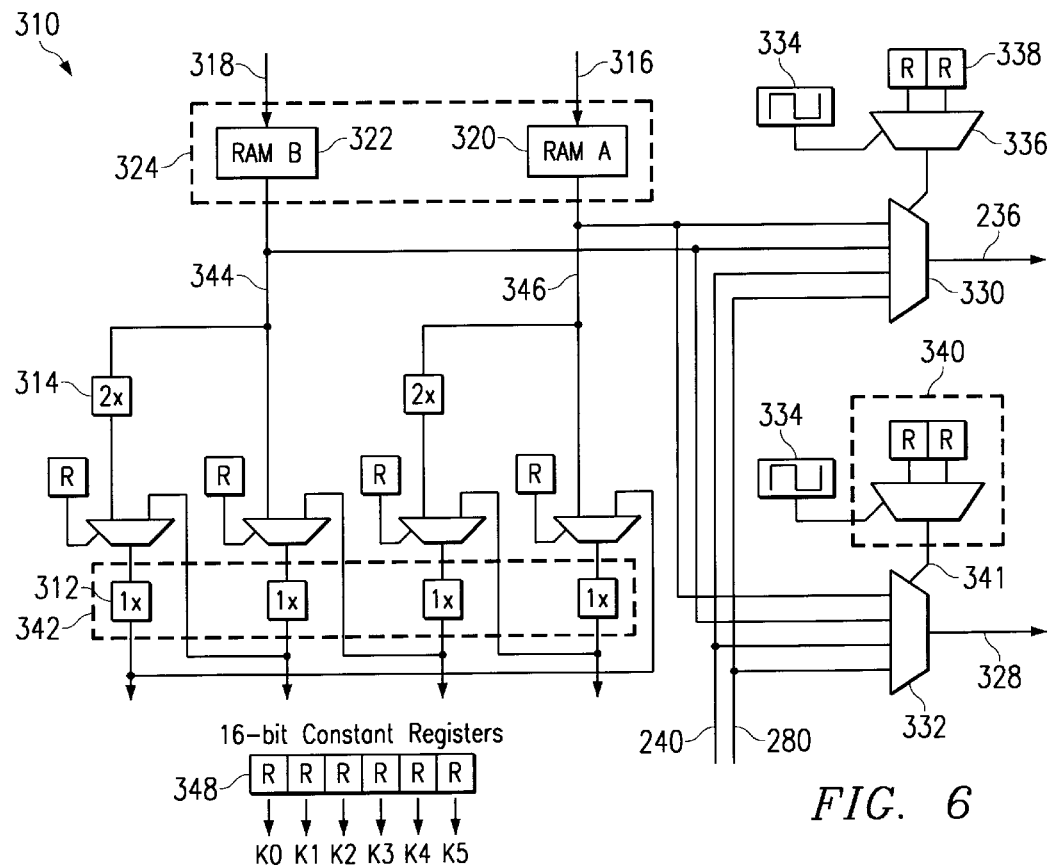
FIG. 6 is a detailed circuit diagram of the second macrocell section according to one embodiment of the invention.

FIG. 5 illustrates the low level architecture of the macrocell 160 portion. Data streams entering a macrocell are first equalized in time to other data streams that will be operated on in conjunction with each other. This insures delay equalization regardless of the path taken by various signals (such as red, green, and blue). Data that has been equalized may then pass directly to other logic within the macrocell 160 or may be used as output to a subsequent macrocell if so configured. Equalization of data is performed by equalization RAMs as illustrated in FIG. 6 and discussed below.

In one embodiment, the macrocell 160 may accesses up to four unique input streams and produces up to four unique output streams with each output at two times the pixel clock speed. In addition, six data registers can be used to provide additional numeric inputs to certain parts of the macrocell 160.

The macrocell diagram 160 shows the routing and control logic associated with a macrocell 160. The low level depiction of a macrocell 160 illustrates how digital signals may be processed using standard IC components such as adders, multipliers and an array of combinational logic circuits. In one embodiment, six 16-bit constant registers are generated from macrocell 160 and used to feed constant values to other logic of the macrocell 160. Control logic is utilized to synchronize the actions of macrocell 160.

As shown, macrocell 160 includes multiplexer 194 whose selection of inputs 192 are driven by selection logic 196.

Multiplexer 194 selects between one of the four unique input channels 192. Multiplexers 194 selection of inputs 192 is controlled differently for each clock phase. Input selection 198 is similar to input selection 192, except the available inputs are the four unique stream inputs 192, plus four constants 200 from on chip memory registers, for a total of 8 possible inputs. Control logic 202 places a logical value on multiplexer 204's select line enabling multiplexer 204 to select from one of the four unique input streams 192 or from one of the constants 200.

Bitwise block 206 and bitwise block 208 are also controlled individually for each clock phase. Control logic 210 is used to select the functional operation of bitwise block 206 and 208. Bitwise block 206 and bitwise block 208 control data coming into adder 209. Multiplexer result 212 and input data 214 from multiplexer 204 may pass untouched into adder 209, negated, forced to zero, forced to one, force positive (absolute value), force negative, and force ±1 based on the sign of the input. To perform a negation, bitwise block 206 and bitwise block 208 invert the bits, and set the carry input to the adder 209. Therefore, if select input 212 and select input 214 are simultaneously negated, the adder 209 will produce an incorrect result.

The numeric format of bitwise units 206 and 208 may be specified to accommodate ±1.14, ±3.12, and ±5.10 streams 500. No translation between data formats occur, and the same control logic 210 controls both bitwise blocks 206 and 208, because the inputs 212 and 214 to the adder 209 must be the same format. The adders require two inputs of the same numeric format, while multiplier 216 can operate on two inputs of differing formats and generate an output format independent of the input formats. Adder 209 performs the designated operation and produces the adder result 218 which is made available to multiplexer 220 preceding multiplier 216.

Multiplexer 222 selects from input 212 and input 214. Control logic 224 controls multiplexer 222 selection process. Control logic 224 select line is controlled by the sign bit 226 from the adder result 218. Note that the data passed is prior to any manipulation done by bitwise block 206 and bitwise block 208. Multiplexer 220 is used to make a selection between the adder result 218, and multiplexer result 228 of the conditional selection of bitwise block input 212 and bitwise block input 214.

Input stream 230 is similar to input stream 198, except that the sign bit 226 from adder result 218 may also be used to control the selection of inputs for each clock phase, and the available selection of constants is slightly different. Multiplexer 231 selection of inputs is controlled by the logical value from the combinational logic circuitry 232. Combinational logic 232 is the same as the logic circuitry for input selection 192 and input selection 198 except that the sign bit 226 from adder result 218 is used in the selection process for each clock phase.

Multiplier 216 multiplies multiplexer result 234 with multiplexer result 236. Multiplier 216 does not require inputs to be of the same format to process data. Shift register 238 places a configured portion of multiplier 216's result on multiply output line 240. The user may specify which bits of the 32-bit result are passed forward to the next stage.

Since adder 242 must operate with the same data format, the same control logic is used to control the numeric format of bitwise unit 244 and bitwise unit 246. Control logic 248 is used to control the numeric operation of bitwise block 244 and bitwise block 246 for each clock phase. Sign bit 226 from adder result 218 is used to enable control logic 248 selection of operation mode for bitwise blocks 244 and 246. The control logic 248 controls the bitwise units 244 and 246 functional mode.

Input stream 250 is similar to input stream 230, except the available selection of constants is yet again slightly different. Sign bit 226 from adder result 218 enables control logic 252 logic value used to enable multiplexer 254 selection of inputs.

Multiplexer 256 selects between the output of multiplexer 254, and the multiplication output 240 delayed by either one or two clock phases 258. This allows information on adjacent clock phases or adjacent pixels to be operated on together. Control logic 260 controls multiplexer 262 selection of multiplication output 240 or multiplication output 240 with one phase delay. The output of multiplexer 262 is also delayed by one phase delay. Multiplexer 256 selects between the one or two phase delay line or the output from multiplexer 254.

Multiplexer 264 selects from any of the four adder inputs 212, 214, 240, 266 prior to any of the bitwise block inputs. Multiplexer 268 and control logic 270 are logic circuitry used to place the logic value on the select input line for multiplexer 264. Sign bit 272 and sign bit 226 are used as the selection inputs to multiplexer 268. Multiplexer 282 selects from multiplexer result 274 and adder result 276. The selection is made with each clock phase and passed on to the clipping block 278.

Control logic controls the function of the clipping block 278 with each clock phase to accommodate ±1.14, ±3.12, and ±5.10 streams. Positive values may be clipped to 0.50, 0.999999, or 1.00. Negative values may be clipped to 0.00 or −0.50. At this point, the data stream can be clipped to any pre-selected values, to insure that it meets with the requirements of whatever format is used. Macrocell 160 offers two outputs a multiplication result output 240 and a addition result output 280.

In operation, the selection of inputs and constants into the macrocell is accomplished during configuration depending on the application. Accordingly, a routine simulating various functional operations of an MSIC are illustrated below according to contemplated embodiments.

```
library ieee;
use ieee.std_logic_1164.all;
package MStypes is
    constant MSstreamSize : integer := 16;
    constant MScstreamSize : integer := MSstreamSize + 1;
    constant MSXIntegerSize : integer := 2;
    constant MSXFractionSize : integer := 14;
    constant MSXSignPosition : integer := 15;
    constant MSXIntLeft : integer := MSXSignPosition;
    constant MSXIntRight : integer := 14;
    constant MSXFracLeft : integer := 13;
    constant MSXFracRight : integer := 0;
    constant MSYIntegerSize : integer := 4;
    constant MSYFractionSize : integer := 12;
    constant MSYSignPosition : integer := MSXSignPosition;
    constant MSYIntLeft : integer := MSXSignPosition;
    constant MSYIntRight : integer := 12;
    constant MSYFracLeft : integer := 11;
    constant MSYFracRight : integer := 0;
    constant MSZIntegerSize : integer := 6;
    constant MSZFractionSize : integer := 10;
    constant MSZSignPosition : integer := MSXSignPosition;
    constant MSZIntLeft : integer := MSXSignPosition;
    constant MSZIntRight : integer := 10;
    constant MSZFracLeft : integer := 9;
    constant MSZFracRight : integer := 0;
    constant modeX : std_ulogic_vector(1 downto 0) := "00"; -- 2.14 format
    constant modeY : std_ulogic_vector(1 downto 0) := "01"; -- 4.12 format
    constant modeZ : std_ulogic_vector(1 downto 0) := "10"; -- 6.10 format
    -- define various bus types
    subtype MSstream is std_ulogic_vector( MSstreamSize-1 downto 0 );
    type MScarryStream is record
        carry : std_ulogic;
        stream : MSstream;
    end record;
    subtype MSstreamMode is std_ulogic_vector( 1 downto 0 );
-- various functions that help out in places
    function vec2stdu ( D : std_ulogic_vector ) return std_ulogic;
    function stdu2vec ( D : std_ulogic ) return std_ulogic_vector;
    function cstream2vec ( s : MScarrystream) return std_ulogic_vector;
    function vec2cstream ( v : std_ulogic_vector) return MScarrystream;
-- constants for the bitwise blocks
    constant NOOP : std_ulogic_vector(2 downto 0) := "000";
    constant NEGATE : std_ulogic_vector(2 downto 0) := "001";
    constant POSITIVEABS : std_ulogic_vector(2 downto 0) := "010";
    constant NEGATIVEABS : std_ulogic_vector(2 downto 0) := "011";
    constant FORCEZERO : std_ulogic_vector(2 downto 0) := "100";
    constant FORCEONE : std_ulogic_vector(2 downto 0) := "101";
    constant ONESIGN : std_ulogic_vector(2 downto 0) := "110";
-- constants for the clipping block
    constant LCLIPNONE : std_ulogic_vector(1 downto 0) := "00";
    constant LCLIPZERO : std_ulogic_vector(1 downto 0) := "01";
    constant LCLIPHALF : std_ulogic_vector(1 downto 0) := "10";
    constant UCLIPNONE : std_ulogic_vector(1 downto 0) := "00";
    constant UCLIPHALF : std_ulogic_vector(1 downto 0) := "01";
    constant UCLIPALMOST : std_ulogic_vector(1 downto 0) := "10";
    constant UCLIPONE : std_ulogic_vector(1 downto 0) := "11";
end MStypes;
package body MStypes is
    function vec2stdu ( D : std_ulogic_vector ) return std_ulogic is
    begin return D(0); end vec2stdu;
    function stdu2vec ( D : std_ulogic ) return std_ulogic_vector is
    variable v : std_ulogic_vector(0 downto 0); begin v(0) := D; return v; end stdu2vec;
    function cstream2vec ( s : MScarrystream) return std_ulogic_vector is
    variable v : std_ulogic_vector(MScstreamSize-1 downto 0);
    begin v := stdu2vec(s.carry) & s.stream; return v; end cstream2vec;
    function vec2cstream ( v : std_ulogic_vector ) return MScarrystream is
    variable s : MScarrystream;
    begin
```

```
        s.carry := v(v'Left);
        s.stream := v(MSstreamSize-1 downto 0);
    return s; end vec2cstream;
end MStypes;
```

Likewise, the following is a sample of a simulation routine used to illustrate the functionality of the various parts of the MSIC:

```
library ieee;
use ieee.std_logic_1164.all;
use work.MStypes.all;
entity MSdlyl is
    port ( clk : in std_ulogic; D in MSstream, Q : out MSstream);
end;
architecture B of MSdlyl is
    signal internal : MSstream;
begin
    Q <= internal;
    dly : process ( clk )
    begin
        if clk'event and clk='1' then
            internal <= D;
        end if;
    end process;
end B;
library ieee;
use ieee.std_logic_1164.all;
use work.MStypes.all;
package MSdelay is
    component MSdlyl
        port ( clk : in std_ulogic; D : in MSstream; Q : out MSstream );
    end component;
end MSdelay;
```

The following simulation routine in one embodiment may be used to illustrate the functionality of various parts of a macrocell, such as the bitwise arithmetic logic untis.

```
-- Bitwise ALU
library ieee;
use ieee.std_logic_1164.all;
use work.Mstypes.all;
entity MSbitwise is
port ( operation : in std_ulogic_vector(2 downto 0);
        mode : in MSstreamMode;
        D : in MSstream;
        Q : out MscarryStream);
end;
architecture B of MSbitwise is
    signal incomingSignBit : std_ulogic;
    signal wideSign, wideZero, mungeX, mungeY, mungeZ : MSstream;
begin
-- We support 2.14, 4.12, and 6.10 modes. All share the same position for the sign bit!
    incomingSignBit <= D(MSXSignPosition);
sGen: for i in wideSign'Left downto wideSign'Right generate
        wideSign(i) <= incomingSignBit;
end generate;
zGen: for i in wideZero'Left downto wideZero'Right generate
        wideZero(i) <= '0';
end generate;
-- How it works:
--   outgoing field:                              carryout
--   incoming fields:   sign      {integer}  one        fraction
--                       s        int        one        fra
--   Force Output "0"    0        0          0          0
--   Force Output "1"    0        1          0          0
--   value               s        int        one        fra     0
--   -value             !s        !int       !one       !fra    1
--   |value|             0        sXORint    sXORone    sXORfra s
--   -|value|            1        !sXORint   !sXORone   !sXORfra !s
--   +/- 1               s        s          1          0       0
-- sign bit
-- pass for v, +/-
-- invert for -v
-- set for -|v|
-- clear otherwise
with operation select mungeX(MSXIntLeft) <=
                    incomingSignBit when NOOP | ONESIGN,
                not incomingSignBit when NEGATE,
                    '1' when NEGATIVEABS,
                    '0' when others;
with operation select mungeY(MSYIntLeft) <=
```

-continued

```
                    incomingSignBit when NOOP | ONESIGN,
                not incomingSignBit when NEGATE,
                            '1' when NEGATIVEABS,
                            '0' when others;
with operation select mungez(MSZIntLeft) <=
                    incomingSignBit when NOOP | ONESIGN,
                not incomingSignBit when NEGATE,
                            '1' when NEGATIVEABS,
                            '0' when others;
-- all integer bits except for the ones' place (excluding incoming sign bit)
-- pass for v
-- invert for –v
-- XOR with incoming sign for |v|
-- XOR with inverted incoming sign for –|v|
-- replace with sign for +/–
-- clear otherwise
-- mungeX is s1.14 format and has no bits here
with operation select mungeY(MSYIntLeft-1 downto MSYIntRight+1) <=
                    D(MSYIntLeft-1 downto MSYIntRight+1) when NOOP,
                not D(MSYIntLeft-1 downto MSYIntRight+1) when NEGATE,
            wideSign(MSYIntLeft-1 downto MSYIntRight+1) xor
                    D(MSYIntLeft-1 downto MSYIntRight+1) when POSITIVEABS,
        not wideSign(MSYIntLeft-1 downto MSYIntRight+1) xor
                    D(MSYIntLeft-1 downto MSYIntRight+1) when NEGATIVEABS,
            wideSign(MSYIntLeft-1 downto MSYIntRight+1) when ONESIGN,
            wideZero(MSYIntLeft-1 downto MSYIntRight+1) when others;
with operation select mungeZ(MSZIntLeft-1 downto MSZIntRight+1) <=
                    D(MSZIntLeft-1 downto MSZIntRight+1) when NOOP,
                not D(MSZIntLeft-1 downto MSZIntRight+1) when NEGATE,
            wideSign(MSZIntLeft-1 downto MSZIntRight+1) xor
                    D(MSZIntLeft-1 downto MSZIntRight+1) when POSITIVEABS,
        not wideSign(MSZIntLeft-1 downto MSZIntRight+1) xor
                    D(MSZIntLeft-1 downto MSZIntRight+1) when NEGATIVEABS,
            wideSign(MSZIntLeft-1 downto MSZIntRight+1) when ONESIGN,
            wideZero(MSZIntLeft-1 downto MSZIntRight+1) when others;
-- the integer bit corresponding to the ones place
-- pass for v
-- invert for –v
-- XOR with incoming sign for v
-- XOR with inverted incoming sign for –|v|
-- set for 1, +/–
-- clear otherwise
with operation select mungeX(MSXIntRight) <=
                    D(MSXIntRight) when NOOP,
                not D(MSXIntRight) when NEGATE,
            incomingSignBit xor D(MSXIntRight) when POSITIVEABS,
        not incomingSignBit xor D(MSXIntRight) when NEGATIVEABS,
                            '1' when FORCEONE ONESIGN,
                            '0' when others;
with operation select mungeY(MSYIntRight) <=
                    D(MSYIntRight) when NOOP,
                not D(MSYIntRight) when NEGATE,
            incomingSignBit xor D(MSYIntRight) when POSITIVEABS,
        not incomingSignBit xor D(MSYIntRight) when NEGATIVEABS,
                            '1' when FORCEONE | ONESIGN,
                            '0' when others;
with operation select mungeZ(MSZIntRight) <=
                    D(MSZIntRight) when NOOP,
                not D(MSZIntRight) when NEGATE,
            incomingSignBit xor D(MSZIntRight) when POSITIVEABS,
        not incomingSignBit xor D(MSZIntRight) when NEGATIVEABS,
                            '1' when FORCEONE | ONESIGN,
                            '0' when others;
-- the fraction bits
-- pass for v
-- invert for –v
-- XOR with incoming sign bit for |v|
-- XOR with inverted incoming sign for –|v|
-- clear otherwise
with operation select mungeX(MSXFracLeft downto MSXFracRight) <=
                    D(MSXFracLeft downto MSXFracRight) when NOOP,
                not D(MSXFracLeft downto MsxFracRight) when NEGATE,
            wideSign(MSXFracLeft downto MSXFracRight) xor
                    D(MSXFracLeft downto MSXFracRight) when POSITIVEABS,
    not wideSign(MSXFracLeft downto MSXFracRight) xor
                    D(MSXFracLeft downto MSXFracRight) when NEGATIVEABS,
            wideZero(MSXFracLeft downto MsXFracRight) when others;
with operation select mungeY(MSYFracLeft downto MSYFracRight) <=
                    D(MSYFracLeft downto MSYFracRight) when NOOP,
```

```
                not D(MSYFracLeft downto MSYFracRight) when NEGATE,
            wideSign(MSYFracLeft downto MSYFracRight) xor
                    D(MSYFracLeft downto MSYFracRight) when POSITIVEABS,
    not wideSign(MSYFracLeft downto MSYFracRight) xor
                    D(MSYFracLeft downto MSYFracRight) when NEGATIVEABS,
            wideZero(MSYFracLeft downto MSYFracRight) when others;
    with operation select mungeZ(MSZFracLeft downto MSZFracRight) <=
                    D(MSZFracLeft downto MSZFracRight) when NOOP,
                not D(MSZFracLeft downto MSZFracRight) when NEGATE,
            wideSign(MSZFracLeft downto MSZFracRight) xor
                    D(MSZFracLeft downto MSZFracRight) when POSITIVEABS,
    not wideSign(MSZFracLeft downto MSZFracRight) xor
                    D(MSZFracLeft downto MSZFracRight) when NEGATIVEABS,
            wideZero(MSZFracLeft downto MSZFracRight) when others;
    with operation select Q.carry <=
                        incomingSignBit when POSITIVEABS,
                        not incomingSignBit when NEGATIVEABS,
                            '1' when NEGATE,
                            '0' when others;
    with mode select Q.stream <= mungeX when modeX,
                            mungeY when modeY,
                            mungeZ when others;
endB;
library ieee;
use ieee.std_logic_1164.all;
use ieee.std_logic_signed.all;
use work.MStypes.all;
entity MSstreamAdder is
    port ( A, B : in MScarryStream;
            Y : out MScarryStream );
end;
architecture B of MSstreamAdder is
    signal inA, inB, inC, outY : std_logic_vector(MScstreamSize-1 downto 0);
begin
    inA(inA'Left-1 downto 0) <= To_StdLogicVector(A.stream);
    inA(inA'Left) <= '0';
    inB(inB'Left-1 downto 0) <= To_StdLogicVector(B.stream);
    inB(inB'Left) <= '0';
    zGen: for i in inC'Left downto inC'Right+1 generate
        inC(i) <= '0';
    end generate;
    inC(0) <= A.carry or B.carry;
    outY <= inA + inB + inC;
    Y.stream <= To_StdULogicVector(outY(MsstreamSize-1 downto 0));
    Y.carry <= outY ( outY'Left );
end B;
use work.COMPONENTS.all; -- /synopsys/libraries/syn/lsi_components.vhd
architecture CarrySelect of MSstreamAdder is
-- HalfAdder : HA1 port map (A => ,B => ,S => ,CO => );
-- FullAdder : FA1 port map (CI => ,A=> ,B => ,S => ,CO => );
begin
    level0: for i in A.stream'Left downto A.stream'Right generate
        end generate;
end CarrySelect;
------------------------------------------------------DESIGN UNIT 3
library ieee;
use ieee.std_logic_1164.all;
use work.MStypes.all;
entity CarryLookahead is
generic ( bits : positive );
port ( CI : in std_ulogic;
        A, B : in std_ulogic_vector(bits-1 downto 0);
        S : out std_ulogic_vector(bits-1 downto 0);
        CO : out std_ulogic);
end;
architecture B of CarryLookahead is
    signal G, P : std_ulogic_vector(bits-1 downto 0);
    signal C : std_ulogic_vector(bits downto 0);
begin
    C(0) <= CI;
    gen: for i in bits-1 downto 0 generate
        G(i) <= A(i) and B(i);
        P(i) <= A(i) xor B(i);
        C(i+1) <= G(i) or (P(i) and C(i));
        S(i) <= P(i) xor C(i);
    end generate;
    CO <= C(bits);
endB;
--------------------------------------------------------------DESIGN UNIT 3
```

-continued

```
library ieee;
use ieee.std_logic_1164.all;
use work.Mstypes.all;
entity CarryLookahead4 is
port ( CI : in std_ulogic;
            A, B : in std_ulogic_vector(3 downto 0);
            S : out std_ulogic_vector(3 downto 0);
            CO : out std_ulogic);
end;
use work.COMPONENTS.all; -- /synopsys/libraries/syn/lsi_components.vhd
architecture Omondi of CarryLookahead4 is
    signal G, P : std_ulogic_vector(3 downto 0);
    signal C : std_ulogic_vector(4 downto 0);
    signal q : std_ulogic_vector(9 downto 0);
    signal q6a, c4a : std_ulogic;
begin
C(0) <= CI;
gen: for i in 3 downto 0 generate
    iGx : ND2 port map (A(i), B(i), iG(i));
    G(i) <= not iG(i);
    Px : EO port map (A(i), B(i), P(i));
    Si : EO port map (P(i), C(i), S(i));
end generate;
OQ0 : ND2 port map (P(0), C(0), Q(0));
OQ1 : ND3 port map (P(1), P(0), C(0), Q(1));
OQ2 : ND2 port map (P(1), G(0), Q(2));
OQ3 : ND4 port map (P(2), P(1), P(0), C(0), Q(3));
OQ4 : ND3 port map (P(2), P(1), G(0), Q(4));
OQ5 : ND2 port map (P(2), G(1), Q(5));
OQ6 : ND5 port map (P(3), P(2), P(1), P(0), C(0), Q(6));
OQ7 : ND4 port map (P(3), P(2), P(1), G(0), Q(7));
OQ8 : ND3 port map (P(3), P(2), G(1), Q(8));
OQ9 : ND2 port map (P(3), G(2), Q(9));
c1 : ND2 port map (iG(0), Q(0), C(1));
c2 : ND3 port map (iG(1), Q(1), Q(2), C(2));
c3 : ND4 port map (iG(2), Q(3), Q(4), Q(5), C(3));
c4 : ND5 port map (iG(3), Q(6), Q(7), Q(8), Q(9), CO );
end ModifiedOmondi;
use work. GTECH_components. all; -- /synopsys/packages/gtech/src/GTECH_components.vhd
architecture GTModifiedOmondi of CarryLookahead4 is
    signal iG, G, P, C : std_ulogic_vector(3 downto 0);
    signal q : std_ulogic_vector(9 downto 0);
begin
    C(0) <= CI;
    gen: for i in 3 downto 0 generate
        iGx : GTECH_NAND2 port map (A(i), B(i), iG(i));
        G(i) <= not iG(i);
        Px : GTECH_XOR2 port map (A(i), B(i), P(i));
        Si : GTECH_XOR2 port map (P(i), C(i), S(i));
    end generate;
    nQ0 : GTECH_NAND2 port map (P(0), C(0), Q(0));
    nQ1 : GTECH_NAND3 port map (P(1), P(0), C(0), Q(1));
    nQ2 : GTECH_NAND2 port map (P(1), G(0), Q(2));
    nQ3 : GTECH_NAND4 port map (P(2), P(1), P(0), C(0), Q(3));
    nQ4 : GTECH_NAND3 port map (P(2), P(1), G(0), Q(4));
    nQ5 : GTECH_NAND2 port map (P(2), G(1), Q(5));
    nQ6 : GTECH_NAND5 port map (P(3), P(2), P(1), P(0), C(0), Q(6));
    nQ7 : GTECH_NAND4 port map (P(3), P(2), P(1), G(0), Q(7)),
    nQ8 : GTECH_NAND3 port map (P(3), P(2), G(1), Q(8));
    nQ9 : GTECH_NAND2 port map (P(3), G(2), Q(9));
    c1 : GTECH_NAND2 port map (iG(0), Q(0), C(1));
    c2 : GTECH_NAND3 port map (iG(1), Q(1), Q(2), C(2));
    c3 : GTECH_NAND4 port map (iG(2), Q(3), Q(4), Q(5), C(3));
    c4 : GTECH_NAND5 port inap (iG(3), Q(6), Q(7), Q(8), Q(9), CO );
end GTModifiedOmondi;
architecture Beh of CarryLookahead4 is
    signal G, P : std_ulogic_vector(3 downto 0);
    signal C : std_ulogic_vector(4 downto 0);
begin
    gen: for i in 3 downto 0 generate
        G(i) <= A(i) and B(i);
        P(i) <= A(i) xor B(i);
-- C(i+1) <= G(i) or (P(i) and C(i));
        S(i) <= P(i) xor
end generate;
C(0) <= CI;
    C(1) <= G(0)                            or (P(0) and C(0));
    C(2) <= G(1) or (P(1) and G(0))
                            or (P(1) and P(0) and C(0));
```

```
    C(3) <= G(2) or (P(2) and G(1)) or (P(2) and P(1) and G(0))
                    or (P(2) and P(1) and P(0) and C(0));
    C(4) <= G(3) or (P(3) and G(2)) or (P(3) and P(2) and G(1)) or (P(3) and P(2) and P(1) and G(0))
                    or (P(3) and P(2) and P(1) and P(0) and C(0));
    CO <= C(4);
end Beh;
-------------------------------------------------DESIGN UNIT 3
--
-- MSstream Multiplier
library ieee;
use ieee.std_logic_1164.all;
use ieee.std_logic_signed.all;
--use ieee.std_logic_arith.all;
use work.MStypes.all;
entity MSstreamMultiplier is
    port ( A, B : in MSstream;
            mode : in std_ulogic_vector(2 downto 0);
            Y : out MSstream);
end;
architecture B of MSstreamMultiplier ls
    signal outY   : std_ulogic_vector( MSstreamSize*2-1 downto 0 );
    signal signExtended : std_ulogic_vector( MSstreamSize*2+1 downto 0 );
begin
    outY <= To_StdULogicVector(To_StdLogicVector(A)* To_StdLogicVector(B));-- multiply the stream s
    -- use only 31 places, becase redundant sign in msbs (b31==b30)
    signExtended(outY'Left-1 downto outY'Right) <= outY(outY'Left-1 downto outY'Right);
    -- now sign extend to 34 binary places
    signExtended(signExtended'Left-2) <= outY(outY'Left-1);
    signExtended(signExtended'Left-1) <= outY(outY'Left-1);
    signExtended(signExtended'Left)   <= outY(outY'Left-1);
    with mode select Y <= signExtended(33 downto 18) when "000", -- 1.14 x 1.14 to 5.10
                    signExtended(31 downto 16) when "001", -- three combinations
        signExtended(30) & signExtended(28 downto 14) when "010", -- six combinations
        signExtended(30) & signExtended(26 downto 12) when "011", -- seven combinations
        signExtended(30) & signExtended(24 downto 10) when "100", -- six combinations
        signExtended(30) & signExtended(22 downto 8) when "101", -- three combinations
        signExtended(30) & signExtended(20 downto 6) when others; -- 5.10 x 5.10 to 1.14
end B;
-----------------------------------------------------------DESIGN UNIT 4
-- MSstream Clip
library ieee;
use ieee.std_logic_1164.all;
use work.MStypes.all;
entity MsstreamClip is
    port ( operation : in std_ulogic_vector ( 3 downto 0 );
            mode : in MSstreamMode;
            D : in MSstream;
            Y : out MSstream);
end;
architecture B of MSstreamClip is
    signal isNegative : Boolean;
    signal zero, posMaximum, negMaximum, one, almostOne, poshalf, neghalf: MSstream;
    signal oneX, almostOneX, posHalfX, negHalfX : MSstream;
    signal oneY, almostOneY, posHalfY, negHalfY : MSstream;
    signal oneZ, almostOneZ, posHalfZ, negHalfZ : MSstream;
begin
    zero <= (others => '0');
        posMaximum(posMaximum'Left-1 downto posMaximum'Right) <= zero(zero'Left-1 downto
zero'Right);
        posMaximum(posMaximum'Left) <= '1';
        negMaximum <= not posMaximum;
        g1: for i in MSXFracLeft downto MSXFracRight generate oneX(i) <= '0'; end generate;
        g2: for i in MSYFracLeft downto MSYFracRight generate oneY(i) <= '0'; end generate;
        g3: for i in MSZFracLeft downto MSZFracRight generate oneZ(i) <= '0'; end generate;
        oneX(MSXIntRight) <= '1';
        oneY(MSYIntRight) <= '1';
        oneZ(MSZIntRight) <= '1';
        g4: for i in MSXIntLeft downto MSXIntRight+1 generate oneX(i) <= '0'; end generate;
        g5: for i in MSYIntLeft downto MSYIntRight+1 generate oneY(i) <= '0'; end generate;
        g6: for i in MSZIntLeft downto MSZIntRight+1 generate oneZ(i) <= '0'; end generate;
        g7: for i in MSXFracLeft downto MSXFracRight generate almostOneX(i) <= '1'; end generate;
        g8: for i in MSYFracLeft downto MSYFracRight generate almostOneY(i) <= '1'; end generate;
        g9: for i in MSZFracLeft downto MSZFracRight generate almostOneZ(i) <= '1'; end generate;
        g10: for i in MSXIntLeft downto MSXIntRight generate almostOneX(i) <= '0'; end generate;
        g11: for i in MSYIntLeft downto MSYIntRight generate almostOneY(i) <= '0'; end generate;
        g12: for i in MSZIntLeft downto MSZIntRight generate almostOneZ(i) <= '0'; end generate;
        g13: for i in MSXFracLeft-1 downto MSXFracRight generate posHalfX(i) <= '1'; end generate;
        g14: for i in MSYFracLeft-1 downto MSYFracRight generate posHalfY(i) <= '1'; end generate;
        g15: for i in MSZFracLeft-1 downto MSZFracRight generate posHalfZ(i) <= '1'; end generate;
```

```
            posHalfX(MSXFracLeft) <= '0';
            posHalfY(MSYFracLeft) <= '0';
            posHalfZ(MSZFracLeft) <= '0';
            g16: for i in MSXIntLeft downto MSXIntRight generate posHalfX(i) <= '0'; end generate;
            g17: for i in MSYIntLeft downto MSYIntRight generate posHalfY(i) <= '0'; end generate;
            g18: for i in MSZIntLeft downto MSZIntRight generate posHalfZ(i) <= '0'; end generate;
            g19: for i in MSXPracLeft-1 downto MSXFracRight+1 generate negHalfX(i) <= '0'; end generate;
            g20: for i in MSYFracLeft-1 downto MSYFracRight+1 generate negHalfY(i) <= '0'; end generate;
            g21: for i in MSZFracLeft-1 downto MSZFracRight+1 generate negHalfZ(i) <= '0'; end generate;
            negHalfX(MSXFracLeft) <= '1';
            negHalfY(MSYFracLeft) <= '1';
            negHalfZ(MSZFracLeft) <= '1';
            negHalfX(MSXFracRight) <= '1';
            negHalfY(MSYFracRight) <= '1';
            negHalfZ(MSZFracRight) <= '1';
            g22: for i in MSXIntLeft downto MSXIntRight generate negHalfX(i) <= '1'; end generate;
            g23: for i in MSYIntLeft downto MSYIntRight generate negHalfY(i) <= '1'; end generate;
            g24: for i in MSZIntLeft downto MSZIntRight generate negHalfZ(i) <= '1'; end generate;
            with mode select one <= oneX when modeX,
                     oneY when modeY,
                     oneZ when others;
with mode select almostOne <= almostOneX when modeX,
                     almostOneY when modeY,
                     almostOneZ when others;
with mode select posHalf <= posHalfX when modeX,
                     posHalfY when modeY,
                     posHalfZ when others;
with mode select negHalf <= negHalfX when modeX,
                     negHalfY when modeY,
                     negHalfZ when others;
with D(D'Left) select isNegative <= true when '1', false when others;
clip : process ( D, operation, zero, one, almostOne, posHalf, negHalf,
           posMaximum, negMaximum, isNegative )
       variable lowerLimit, upperLimit : MSstream;
       variable cliplow, cliphigh : Boolean;
begin
case operation ( 1 downto 0 ) is
    when LCLIPZERO => lowerLimit := zero;
    when LCLIPHALF => lowerLimit := negHalf;
    when others => lowerLimit := negMaximum;
end case;
if operation(1)='1' or operation(0) = '1' then
    cliplow := true;
else
    cliplow := false;
end if;
case operation ( 3 downto 2 ) is
    when UCLIPHALF => upperLimit := posHalf;
    when UCLIPALMOST => upperLimit := almostOne;
    when UCLIPONE => upperLimit := one;
    when others => upperLimit := posMaximum;
end case;
if operation(3) = '1' or operation(2) = '1' then
    cliphigh := true;
else
    cliphigh := false;
        end if;
        if isNegative then
            if cliplow then
                if D < lowerLimit then
                    Y <= lowerLimit;
                else
                    Y <= D;
                end if;
            else
                Y <= D;
            end if;
        else
            if cliphigh then
                if D > upperLimit then
                    Y <= upperLimit;
                else
                    Y <= D;
                end if;
            else
                Y <= D;
            end if;
        end if;
end process;
```

-continued

```
end B;
--------------------------------------------------DESIGN UNIT 4
library ieee;
use ieee.std_logic_1164.all;
use work.MStypes.all;
package MSarith is
    component MSbitwise
        port ( operation : in std_ulogic_vector(2 downto 0);
               mode : in MSstreamMode;
               D : in MSstream;
               Q : out MScarryStream);
    end component;
    component MSstreamAdder
        port ( A, B : in MScarryStream;
               Y : out MScarryStream );
    end component;
    component MSstreamMultiplier
        port ( A, B : in MSstream;
               mode : in std_ulogic_vector(2 downto 0);
               Y : out MSstream );
    end component;
    component MSstreamClip
        port (operation: in std_ulogic_vector (3 downto 0);
              mode : in MSstreamMode;
              D : in MSstream;
              Y : out MSstream );
    end component;
    component CarryLookahead
        generic ( bits : positive );
        port ( CI : in std_ulogic;
               A, B : in std_ulogic_vector(bits-1 downto 0);
               S : out std_ulogic_vector(bits-1 downto 0);
               CO : out std_ulogic);
    end component;
    component CarryLookahead4
        port ( CI : in std_ulogic;
               A, B : in std_ulogic_vector(3 downto 0);
               S : Out std_ulogic_vector(3 downto 0);
               CO : out std_ulogic);
    end component;
end MSarith;
```

In one embodiment the following logic routine illustrates the simulation routine that simulates in one embodiment the functionality of an MSIC chip:

```
-- 2-input MSIC stream multiplexer, single output
-- sel - selects which input
-- D0, D1 - stream inputs
-- Q - stream output
library ieee;
use ieee.std_logic_1164.all;
use work.MStypes.all;
entity MSmux2stream is
    port ( sel : in std_ulogic; D0, D1 : in MSstream; Q : out MSstream );
end;
architecture B of MSmux2stream is
begin
    with sel select
        Q <= D0 when '0', D1 when others;
end B;
-- 4-input MSIC stream multiplexer, single output
-- sel - selects which input
-- Dn - stream inputs (D0-D3)
-- Q - stream output
library ieee;
use ieee. std_logic_1164.all;
use work.MStypes.all;
entity MSmux4stream is
    port ( sel : in std_ulogic_vector ( 1 downto 0 );
           D0, D1, D2, D3 : in MSstream; Q : out MSstream);
end;
architecture B of MSmux4stream is
begin
```

```
        with sel select Q <= D0 when "00", D1 when "01", D2 when "10", D3 when others;
end B;
-- 8-input MSIC stream multiplexer, single output
-- sel - selects which input
-- Dn - stream mputs (D0–D7)
-- Q - stream output
library ieee;
use ieee.std_logic_1164.all;
use work.MStypes.all;
entity MSmux8stream is
        port ( sel : in. std_ulogic_vector ( 2 downto 0 );
            D0, D1, D2, D3, D4, D5, D6, D7 : in MSstream; Q : out MSstream );
end;
architecture B of MSmux8stream is
begin
        with sel select
            Q <= D0 when "000", D1 when "001", D2 when "010", D3 when "011",
                D4 when "100", D5 when "101", D6 when "110", D7 when others;
end B;
-- 2-output decoder
-- enable - enables the decode
-- sel - chooses which output
-- Yn - one hot output
library ieee;
use ieee.std_logic_1164.all;
entity MSdecode2 is
    port ( enable : in std_ulogic;
            sel : in std_ulogic;
            Y0,Y1 : out std_ulogic );
end;
architecture B of MSdecode2 is
begin
    decode2 : process ( enable, sel )
        begin
            Y0 <= '0';
            Y1 <= '0';
            if enable= '1' then
                case sel is
                    when '0' => Y0 <= '1'; when others => Y1 <= '1';
                end case;
            end if;
        end process;
end B;
-- 4-output decoder
-- enable - enables the decode
-- sel - chooses which output
-- Yn - one hot output
library ieee;
use ieee.std_logic_1164.all;
entity MSdecode4 is
    port ( enable : in std_ulogic;
            sel : in std_ulogic_vector( 1 downto 0 );
            Y0,Y1,Y2,Y3 : out std_ulogic );
end;
architecture B of MSdecode4 is
    component MSdecode2
        port ( enable : in std_ulogic;
                sel : in std_ulogic;
                Y0,Y1 : out std_ulogic );
    end component;
    signal topsel, botsel : std_ulogic;
begin
    topsel <= enable and not sel(sel'Left);
    botsel <= enable and sel(sel'Left);
    top2 : MSdecode2 port map ( topsel, sel(0), Y0, Y1 );
    bottom2 : MSdecode2 port map ( botsel, sel(0), Y2, Y3 );
end B;
architecture B2 of MSdecode4 is
begin
    decode4 : process ( enable, sel )
        begin
            Y0 <= '0'; Y1 <= '0'; Y2 <= '0'; Y3 <= '0';
            if enable='1' then
                case sel is
                    when "00" => Y0 <= '1';   when "01" => Y1 <= '1';
                    when "10" => Y2 <= '1';   when others => Y3 <= '1';
                end case;
            end if;
        end process;
```

-continued

```
end B2;
-- 8-output decoder
-- enable - enables the decode
-- sel - chooses which output
-- Yn - one hot output
library ieee;
use ieee.std_logic_1164.all;
entity MSdecode8 is
    port ( enable : in std_ulogic;
           sel : in std_ulogic_vector( 2 downto 0);
           Y0,Y1,Y2,Y3,Y4,Y5,Y6,Y7 : out std_ulogic);
end;
architecture B of MSdecode8 is
    component MSdecode4
        port ( enable : in std_ulogic;
               sel : in std_ulogic_vector( 1 downto 0);
               Y0,Y1,Y2,Y3 : out std_ulogic);
    end component;
    signal topsel, botsel : std_ulogic;
begin
    topsel <= enable and not sel(sel'Left);
    botsel <= enable and sel(sel'Left);
    top4 : MSdecode4 port map (topsel, sel(sel'Left-1 downto 0), Y0,Y1,Y2,Y3 );
    bottom4 : MSdecode4 port map ( botsel, sel(sel'Left-1 downto 0), Y4,Y5,Y6,Y7 );
end B;
architecture B2 of MSdecode8 is
begin
    decode8 : process ( enable, sel )
        begin
            Y0<='0'; Y1<='0'; Y2<='0'; Y3<='0'; Y4<='0'; Y5<='0'; Y6<='0'; Y7<='0';
            if enable ='1' then
                case sel is
                    when "000" => Y0 <= '1';    when "001" => Y1 <= '1';
                    when "010" => Y2 <= '1';    when "011" => Y3 <= '1';
                    when "100" => Y4 <= '1';    when "101" => Y5 <= '1';
                    when "110" => Y6 <= '1';    when others => Y7 <= '1';
                end case;
            end if;
        end process;
end B2;
-- 16-output decoder
-- enable - enables the decode
-- sel - chooses which output
-- Yn - one hot output
library ieee;
use ieee.std_logic_1164.all;
entity MSdecode16 is
    port ( enable : in std_ulogic;
           sel : in std_ulogic_vector( 3 downto 0 );
           Y0,Y1,Y2,Y3,Y4,Y5,Y6,Y7,Y8,Y9,Y10,Y11,Y12,Y13,Y14,Y15 : out std_ulogic );
end;
architecture B of MSdecode16 is
    component MSdecode8
        port (enable : in std_ulogic;
              sel : in std_ulogic_vector(2 downto 0);
              Y0,Y1,Y2,Y3ThY4,Y5,Y6,Y7 : out std_ulogic);
    end component;
    signal topsel, botsel : std_ulogic;
begin
    topsel <= enable and not sel(sel'Left);
    botsel <= enable and sel(sel'Left);
    top8 : MSdecode8 port map ( topsel, sel(set'Left'1 downto 0), Y0,Y1,Y2, Y3, Y4, Y5, Y6, Y7 );
    bottom8: MSdecode8 port map ( botsel, sel(sel'Left-1 downto 0), Y8,Y9,Y10,Y11,Y12,Y13,Y14,Y15
);
end B;
architecture B2 of MSdecode16 is
begin
    decode 16 : process ( enable, sel )
        begin
            Y0<='0'; Y1<='0'; Y2<='0'; Y3<='0'; Y4<='0'; Y5<='0'; Y6<='0'; Y7<='0';
            Y8<='0'; Y9<='0'; Y10<='0'; Y11<='0'; Y12<='0'; Y13<='0'; Y14<='0'; Y15<='0';
            if enable = '1' then
                case sel is
                    when "0000" =>  Y0 <= '1';    when "0001" =>  Y1 <= '1';
                    when "0010" =>  Y2 <= '1';    when "0011" =>  Y3 <= '1';
                    when "0100" =>  Y4 <= '1';    when "0101" =>  Y5 <= '1';
                    when "0110" =>  Y6 <= '1';    when "0111" =>  Y7 <= '1';
                    when "1000" =>  Y8 <= '1';    when "1001" =>  Y9 <= '1';
                    when "1010" =>  Y10 <= '1';   when "1011" =>  Y11 <= '1';
```

```
                       when "1100" => Y12 <= '1';   when "1101" => Y13 <= '1';
                       when "1110" => Y14 <= '1';   when others => Y15 <= '1';
                   end case;
              end if;
         end process;
end B2;
-- 32-output decoder
-- enable - enables the decode
-- sel - chooses which output
-- Yn - one hot output
library ieee;
use ieee.std_logic_1164.all;
entity MSdecode32 is
    port ( enable : in std_ulogic;
            sel : in std_ulogic_vector( 4 downto 0 );
            Y0, Y1, Y2, Y3, Y4, Y5, Y6, Y7, Y8, Y9, Y10,Y11,Y12,Y13,Y14,Y15,
            Y16,Y17,Y18,Y19,Y20,Y21,Y22,Y23,Y24,Y25,Y26,Y27,Y28,Y29,Y30,Y31 : outstd_ulogic );;
end;
architecture B of MSdecode32 is
    component MSdecode16
         port ( enable : in std_ulogic;
              sel : in std_ulogic_vector(3 downto 0);
              Y0,Y1,Y2,Y3,Y4,Y5,Y6,Y7,Y8,Y9,Y10,Y11,Y12,Y13,Y14,Y15 : out std_ulogic );
         end component;
         signal topsel, botsel : std_ulogic;
begin
    topsel <= enable and not sel(sel'Left);
    botsel <= enable and sel(sel'Left);
    top16 : MSdecode16 port map ( topsel, sel(sel'Left-1 downto 0),
                  Y0, Y1, Y2, Y3, Y4, Y5, Y6, Y7, Y8, Y9,Y10,Y11,Y12,Y13,Y14,Y15 );
    bottom16 : MSdecode16 port map ( botsel, sel(sel'Left-1 downto 0),
                  Y16,Y17,Y18,Y19,Y20,Y21,Y22,Y23,Y24,Y25,Y26,Y27,Y28,Y29,Y30,Y31 );
end B;
architecture B2 of MSdecode32 is
begin
    decode32 : process ( enable, sel )
         begin
              Y0<='0'; Y1<='0'; Y2<='0'; Y3<='0'; Y4<='0'; Y5<='0'; Y6<='0'; Y7<='0';
              Y8<='0'; Y9<='0'; Y10<='0'; Y11<='0'; Y12<='0'; Y13<='0'; Y14<='0'; Y15<='0';
              Y16<='0'; Y17<='0'; Y18<='0'; Y19<='0'; Y20<='0'; Y21 <='0'; Y22<='0'; Y23<='0';
              Y24<='0'; Y25<='0'; Y26<='0'; Y27<='0'; Y28<='0'; Y29<='0'; Y30<='0'; Y31<='0';
              if enable ='1' then
                   case sel is
                       when "00000" =>  Y0 <= '1';    when "00001" =>  Y1 <= '1';
                       when "00010" =>  Y2 <= '1';    when "00011" =>  Y3 <= '1';
                       when "00100" =>  Y4 <= '1';    when "00101" =>  Y5 <= '1';
                       when "00110" =>  Y6 <= '1';    when "00111" =>  Y7 <= '1';
                       when "01000" =>  Y8 <= '1';    when "01001" =>  Y9 <= '1';
                       when "01010" => Y10 <= '1';    when "01011" => Y11 <= '1';
                       when "01100" => Y12 <= '1';    when "01101" => Y13 <= '1';
                       when "01110" => Y14 <= '1';    when "01111" => Y15 <= '1';
                       when "10000" => Y16 <= '1';    when "10001" => Y17 <= '1';
                       when "10010" => Y18 <= '1';    when "10011" => Y19 <= '1';
                       when "10100" => Y20 <= '1';    when "10101" => Y21 <= '1';
                       when "10110" => Y22 <= '1';    when "10111" => Y23 <= '1';
                       when "11000" => Y24 <= '1';    when "11001" => Y25 <= '1';
                       when "11010" => Y26 <= '1';    when "11011" => Y27 <= '1';
                       when "11100" => Y28 <= '1';    when "11101" => Y29 <= '1';
                       when "11110" => Y30 <= '1';    when others => Y31 <= '1';
                   end case;
              end if;
         end process;
end B2;
-- 64-output decoder
-- enable - enables the decode
-- sel - chooses which output
-- Yn - one hot output
library ieee;
use ieee.std_logic_1164.all;
entity MSdecode64 is
    port ( enable : in std_ulogic;
            sel : in std_ulogic_vector( 5 downto 0 );
            Y0, Y1, Y2, Y3, Y4, Y5, Y6, Y7, Y8, Y9, Y10,Y11,Y12,Y13,Y14,Y15,
            Y16,Y17,Y18,Y19,Y20,Y21,Y22,Y23,Y24,Y25,Y26,Y27,Y28,Y29,Y30,Y31,
            Y32,Y33,Y34,Y35,Y36,Y37,Y38,Y39,Y40,Y41,Y42,Y43,Y44,Y45,Y46,Y47,
            Y48,Y49,Y50,Y51,Y52,Y53,Y54,Y55,Y56,Y57,Y58,Y59,Y60,Y61,Y62,Y63 : out std_ulogic);
end;
architecture B of MSdecode64 is
    component MSdecode32
```

-continued

```
        port ( enable : in std_ulogic;
            sel : in std_ulogic_vector(4 downto 0);
            Y0, Y1, Y2, Y3, Y4, Y5, Y6, Y7, Y8, Y9, Y10,Y11,Y12,Y13,Y14,Y15,
            Y16,Y17,Y18,Y19,Y20,Y21,Y22,Y23,Y24,Y25,Y26,Y27,Y28,Y29,Y30,Y31 : out std_ulogic);
        end component;
    signal topsel, botsel : std_ulogic;
begin
    topsel <= enable and not sel(sel'Left);
    botsel <= enable and sel(sel'Left);
    top32 : MSdecode32 port map (topsel, sel(sel'Left-1 downto 0),
Y0, Y1, Y2, Y3, Y4, Y5, Y6, Y7, Y8, Y9, Y10,Y11,Y12,Y13,Y14,Y15,
                Y16,Y17,Y18,Y19,Y20,Y21,Y22,Y23,Y24,Y25,Y26,Y27,Y28,Y29,Y30,Y31 );
    bottom32 : MSdecode32 port map (botsel, sel(sel'Left-1 downto 0),
                Y32,Y33,Y34,Y35,Y36,Y37,Y38,Y39,Y40,Y41,Y42,Y43,Y44,Y45,Y46,Y47,
                Y48,Y49,Y50,Y51,Y52,Y53,Y54,Y55,Y56,Y57,Y58,Y59,Y60,Y61,Y62,Y63 );
end B;
architecture B2 of MSdecode64 is
begin
    decode64 : process ( enable, sel )
    begin
        Y0<='0'; Y1<='0'; Y2<='0'; Y3<='0'; Y4<='0'; Y5<='0'; Y6<='0'; Y7<='0'
            Y8<='0';   Y9<='0'; Y10<='0'; Y11<='0'; Y12<='0';   Y13<='0'; Y14<='0';
Y15<='0';
            Y16<='0';   Y17<='0'; Y18<='0'; Y19<='0'; Y20<='0';   Y21<='0'; Y22<='0';
Y23<='0';
            Y24<='0';   Y25<='0'; Y26<='0'; Y27<='0'; Y28<='0';   Y29<='0'; Y30<='0';
Y31<='0';
            Y32<='0';   Y33<='0'; Y34<='0'; Y35<='0'; Y36<='0';   Y37<='0'; Y38<='0';
Y39<='0';
            Y40<='0';   Y41<='0'; Y42<='0'; Y43<='0'; Y44<='0';   Y45<='0'; Y46<='0';
Y47<='0';
            Y48<='0'; Y49<='0'; Y50<='0'; Y51<='0'; Y52<='0'; Y53<='0'; Y54<='0'; Y55<='0';
            Y56<='0'; Y57<='0'; Y58<='0'; Y59<='0'; Y60<='0'; Y61<='0'; Y62<='0'; Y63<='0';
        if enable='1' then
            case sel is
                when "000000" =>  Y0 <= '1';    when "000001" =>  Y1 <= '1';
                when "000010" =>  Y2 <= '1';    when "000011" =>  Y3 <= '1';
                when "000100" =>  Y4 <= '1';    when "000101" =>  Y5 <= '1';
                when "000110" =>  Y6 <= '1';    when "000111" =>  Y7 <= '1';
                when "001000" =>  Y8 <= '1';    when "001001" =>  Y9 <= '1';
                when "001010" => Y10 <= '1';    when "001011" => Y11 <= '1';
                when "001100" => Y12 <= '1';    when "001101" => Y13 <= '1'
                when "001110" => Y14 <= '1';    when "001111" => Y15 <= '1';
                when "010000" => Y16 <= '1';    when "010001" => Y17 <= '1';
                when "010010" => Y18 <= '1';    when "010011" => Y19 <= '1';
                when "010100" => Y20 <= '1';    when "010101" => Y21 <= '1';
                when "010110" => Y22 <= '1';    when "010111" => Y23 <= '1';
                when "011000" => Y24 <= '1';    when "011001" => Y25 <= '1';
                when "011010" => Y26 <= '1';    when "011011" => Y27 <= '1';
                when "011100" => Y28 <= '1';    when "011101" => Y29 <= '1';
                when "011110" => Y30 <= '1';    when "011111" => Y31 <= '1';
                when "100000" => Y32 <= '1';    when "100001" => Y33 <= '1';
                when "100010" => Y34 <= '1';    when "100011" => Y35 <= '1';
                when "100100" => Y36 <= '1';    when "100101" => Y37 <= '1';
                when "100110" => Y38 <= '1';    when "100111" => Y39 <= '1';
                when "101000" => Y40 <= '1';    when "101001" => Y41 <= '1';
                when "101010" => Y42 <= '1';    when "101011" => Y43 <= '1';
                when "101100" => Y44 <= '1';    when "101101" => Y45 <= '1';
                when "101110" => Y46 <= '1';    when "101111" => Y47 <= '1';
                when "110000" => Y48 <= '1';    when "110001" => Y49 <= '1';
                when "110010" => Y50 <= '1';    when "110011" => Y51 <= '1';
                when "110100" => Y52 <= '1';    when "110101" => Y53 <= '1';
                when "110110" => Y54 <= '1';    when "110111" => Y55 <= '1';
                when "111000" => Y56 <= '1';    when "111001" => Y57 <= '1';
                when "111010" => Y58 <= '1';    when "111011" => Y59 <= '1';
                when "111100" => Y60 <= '1';    when "111101" => Y61 <= '1';
                when "111110" => Y62 <= '1';    when others => Y63 <= '1';
            end case;
        end if;
    end process;
end B2;
```

Referring to FIG. 6, a low level description of the macrocell is shown and denoted generally as 310. Data is routed in and out of macrocell 160 by the upper portion of a macrocell. The boxes labeled "1x" 312 and "2x" 314 denote a set reset circuit called a flip-flop.

Data enters input port 316 and input port 318 and enters equalization RAM 320 and equalization RAM 322, where the incoming streams are optionally equalized to one another in time. Three or four streams may be equalized, or 2 pairs of streams may be independently equalized. The equalization block 324 may also intentionally delay streams; either by an absolute value, or with respect to one another. In one embodiment, a 32 pixels per stream is permitted. To ease the burden of macrocell equalization at the input, and to provide properly equalized signals at the output, the equalization block 324 attempts to bring incoming signals as closely together in time as possible.

Data output 326 and data output 328 make the four unique data streams available as outputs by multiplexer 330 and multiplexer 332. There are four 2x data streams available that may feed output 326 and output 328: two streams from equalization block 324, and a multiply output 240 and an add output 280 from macrocell 190. During each clock phase 334, multiplexer 336 places logic values generated by control registers 338 on the select line of multiplexer 330 which enables multiplexer 330 to select from the selection of inputs. Control logic 340 places a logic value on select line 341 which enables multiplexer 332 to select from the available inputs for each clock phase. If the order of the data needs to be reversed for any reason, it can be accomplished using the equalization block 324.

The 1x data stream block 342 used by the macrocell 310 are generated from the outputs of the equalization block 324. The two 2x data streams 344 and 346 generated by equalization block 324 are broken into four 1x data streams 342. These four streams 342 may represent a single pixel from multiple streams, multiple pixels from a single data stream, or a combination of the two. Finally, there are six 16-bit constant registers 348 that can be used to feed constant values to the macrocell 160. Routing of these constants is shown in the macrocell diagram 160. Configuration registers 348 can be restricted on a bitwise basis. Upon system power up configuration resisters 348 reads and stores configuration parameters. Register 348 values may be changed to allow the MSIC to perform different operational functions for various different applications.

Figure 7:
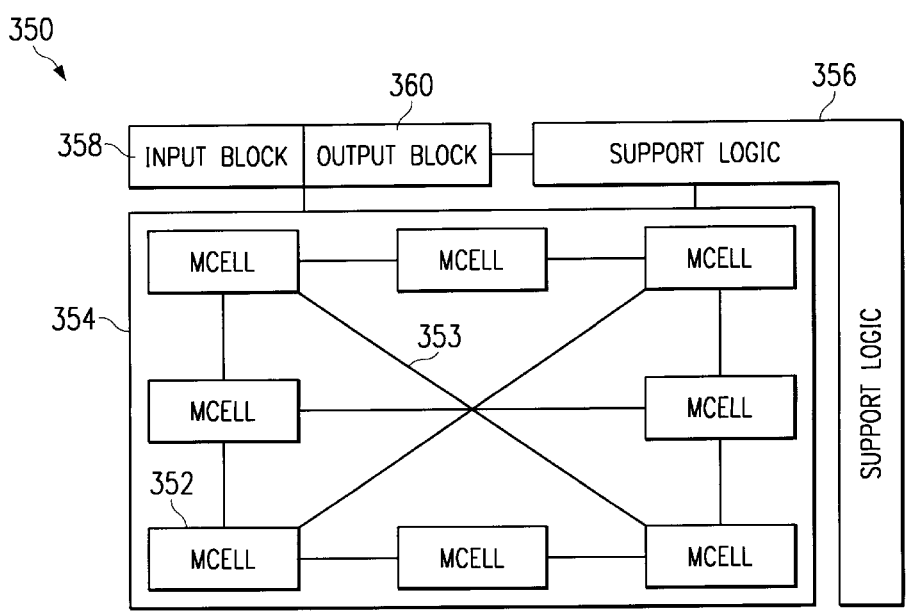
FIG. 7 is a high level depiction of a Market Specific Integrated Circuit ("MSIC") using an array of macrocells according to one embodiment of the invention.

FIG. 7 is a high level depiction of a MSIC and is denoted generally as 350. The MSIC 350 is a programmable/configurable array similar in some respects to FPGA's (Field programmable Gate Arrays). FPGA's are made up of thousands or hundreds of thousands of cells programmed or configured at the gate level using basic and/or boolean logic circuits. Unlike FPGA's the MSIC 350 contains only 8 cells, called Macrocells 352. These macrocells 352 are configurable at the mathematical operation level (addition/subtraction/multiplication/comparison) rather than at the boolean logic level (and/or/xor/invert). This reduces the size of the chip making it more efficient and cost effective while providing better performance.

For example, a single multiplication operation represents thousands of boolean operations. In an MSIC 350, mathematical constructs are built-in for efficiency, and they are configured in the same way that boolean logic operations are configured in an FPGA. As shown, 8 macrocells 352 are used in the MSIC 350 but other macrocells configurations are also envisioned according to various embodiments. For this embodiment, each macrocell 352 operates at up to 40 MHz. For data speeds of 20 MHz or less, each macrocell 352 can be reconfigured twice per data clock to perform to completely different operations, thus effectively providing 16 macrocells 352. For processing speeds between 41–80 MHz, each pair of macrocells 352 alternates operation to effectively provide 4 macrocells 352. The macrocells 352 consist of a core set of arithmetic logic units designed to perform defined math functions. The interconnects 353 between the array of macrocells 354 can be restructured to perform user specified functions so that performance and versatility may be utilized.

The MSIC 350 comprises of a support logic 356 to support the main Macrocell array 354 and a input block 358 and output block 360 to control the input and output ports. Input block 358 takes data in from the MSIC interface, and performs some elementary processing on it to make it suitable for general-purpose processing within the MSIC 350, depending on what format was input. The Output block 360 takes data that has been processed and performs some elementary additional processing to put the data in a suitable format upon exiting MSIC 350, depending on what format is desired.

The support logic block 356 facilitates the programming of macrocells 352, provide information about the incoming signal to other blocks of MSIC 350 and enhances the overall functionality of the MSIC 350 among many other things. Support logic 356 includes several processing elements such as, video line-delays for performing vertical processing on images, and a summation block 404 to allow the outputs of any or all macrocells 352 to be summed together in a programmable fashion. There is also a block that synthesizes the processing clock based on an incoming video signal, insuring synchronicity between the system and the stream signal that it is processing.

Figure 8:
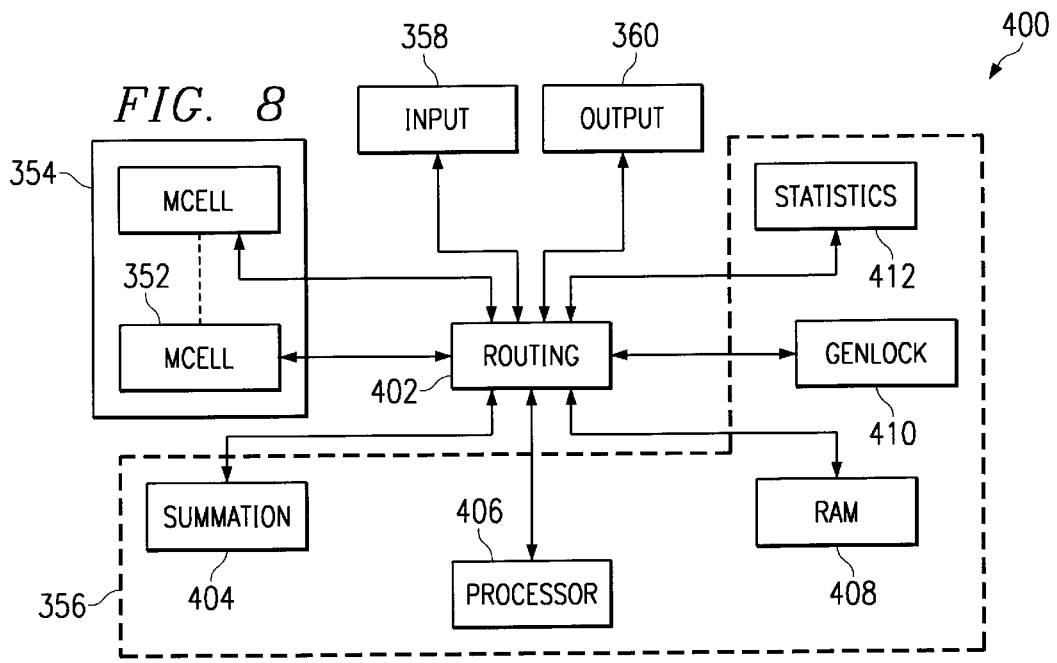
FIG. 8 illustrates the internal flow process of an MSIC according to one embodiment of the invention.

FIG. 8 illustrates a diagram illustrating the internal flow process of a MSIC 350 and is denoted generally as 400. MSIC 350 primarily comprises of a support logic block 356, input block 358 and a output block 360 and a core set of macrocells 354. Diagram 400 depicts the major functional blocks of a MSIC 350 centered around a routing block 402. This is arguable the most accurate representation of data flow within MSIC 350, although in actuality routing is interspersed among the other functional blocks rather than being centralized.

Within MSIC 350, video is represented within the fractional portion of a signed 16-bit fixed-point number. Video data will be contained to the fractional bits and appear as numbers between zero and one. The options for numeric formats are ±1.14, ±3.12, and ±5.10. The sign-bit and the integer bits provide headroom in both directions for intermediate results.

There are differing requirements regarding numeric formats that are imposed by various sections of MSIC 350. For instance, the summation block 404 accepts arbitrary input formats, and generates arbitrary output formats. Multiplier 244 within macrocell 352 also is able to operate on arbitrary input formats, and generate an arbitrary output format. Adders 209 and 242 within macrocell 160 require that the inputs and output are all of identical format.

Summation block 404 connects to every macrocell 352, and can calculate the sum of any arbitrary number of adjacent inputs. An arbitrary number of sums may be calculated this way. This function is provided primarily for use in implementing Finite Impulse Response ("FIR") filters, but other uses may be found. For this embodiment, summation block 404 has 8 inputs, and can sum arbitrary numbers of arbitrary numbers of adjacent inputs. Summation block 404 may sum an arbitrary number of input fields, each of which is composed of an arbitrary number of adjacent inputs.

Processor Interface block 406 allows read/write access to all of the control registers and main RAM blocks 408 in un-configured versions of MSIC 350. In configured versions, the addresses and data for registers pass through an aliasing mechanism that allows for customized address maps and restricted functionality based on the configuration stored in non-volatile RAM. MSIC is equipped with a set of mapping aliases which defines the addresses at which a user can access system configuration parameters.

Genlock block 410 allows the chip to synchronize to the timing of one of the incoming video streams, this provides horizontal and vertical timing information for general-purpose use within the chip. Optionally, this block 410 can generate stand-alone video timing, given an appropriate pixel clock, or can also generate video timing from the course digital data stream which has been converted from the transmitted analog signal. Genlock block 410 is responsible for generating video timing synchronized to the outside world, or stand-alone.

The two timing signals that may be associated with any stream of video data are horizontal and vertical blanking signals. Composite, horizontal, and/or vertical sync signals may also be used. Internally, one or more arbitrary timing signals will be properly processed along with the video stream information. The most common expected configuration is to associate composite sync and horizontal and vertical blank with a video signal. Horizontal and vertical blank will be delayed along with the video, while composite sync will be re-synchronized at the output.

Genlock block 410 will make use of the horizontal and vertical blanking information to generate a full set of video synchronization signals, as well as generating processor interrupts, and providing streams of numbers representing the horizontal and vertical position for use in region definition. Video synchronization signals for input to the genlock block 410 may come from the video inputs, outputs, and possibly also from a dedicated set of video timing input pins.

The video synchronization signals generated by genlock block 410 may be re-synchronized to the output video and used to provide composite sync on video streams that may not have originally contained such information. One example of this is the process of converting ITU-601 video to RS-170A. Since ITU-601 video does not contain any composite sync information, it must be manufactured to generate a valid RS-170A stream.

Statistics block 412 is responsible for calculating useful statistics, such as min, max, mean, etc., on a video stream. This block 412 also is responsible for generating random numbers and outputting them to the rest of MSIC 350. This block 412 will also be able to provide streams of random numbers for use by other portions of MSIC 350. There will be two random number generators on MSIC 350; one providing a static set of random numbers synchronous to the timing of the incoming video, and the other providing random numbers asynchronously to video. There will be three outputs from each generator, each providing a different sequence of numbers.

The image statistics that are calculated by statistics block 412 are intended to be read by the processor. The chip can calculate statistics on a line, field, or frame basis.

This can be done on a one-time, or continual basis. Notification of the completion of statistics calculations is provided both through an interrupt, and through polling facilities. When the calculation is complete, the result is transferred to a temporary holding area before notification of completion is made. This allows a new set of calculations to begin without affecting the previous result. Each input to statistics block 412 may have a different numeric format, and the output will be converted to the desired format. Statistics block 412 has one input from each macrocell 352, and an undetermined number of outputs that feed back into the routing complex.

Input and Output blocks 358, 360 provide the interface to allow video to pass through MSIC 350. There is a single interface input port, and a single interface output port. Each of the interface ports interfaces to either three 10-bit channels, or two 16-bit channels. Each channel may operate at up to 4× pixel clock rate, allowing a total of twelve 10-bit streams or eight 16-bit streams to pass through an MSIC 350. The capability for 10-bit streams is provided primarily for interfacing to standard video devices, while the 16-bit format allows data to be communicated between MSIC 350 without losing numeric precision, regardless of the numeric format.

MSIC 350 can contain twelve 1K×6-bit RAM cells 408. These cells (and their associated logic) may be configured somewhat arbitrarily as either Look-up Tables (called LUT's) or Delay-Lines (Referred to here as FIFO's). The twelve 1K×6-bit RAM blocks within the chip can be configured in a variety of ways, either as FIFO's or LUT's, having varying widths and depths. FIFO's have a variable delay, up to 1K, and can buffer 10-bit, 12-bit, or 16-bit data. LUT's can take a 10–12 bit input and output either 12 or 16 bits. FIFO's and LUT's can be intermixed, as can the differing widths and depths.

The FIFO's can be either 10-bits, 12-bits, or 16-bits wide. In 10-bit and 16-bit modes, two additional video timing signals (such as composite sync) can be delayed through the FIFO along with the video. FIFO's are always 1024 words deep, but delay is programmable. If additional depth is required, FIFO's can be concatenated end-to-end. In 10 and 12-bit modes, there are six FIFO's available. In 16-bit mode, only four FIFO's are available. For line lengths that exceed 1024 when horizontal blanking is taken into consideration, there is also a start/stop mode that will only delay active pixels. Any data in the horizontal blanking region is lost under this scenario.

For example, in Look-up Table (LUT) mode, the twelve RAM's can be configured as follows:

| Input Bits | Output Bits | # LUT's | Notes |
|---|---|---|---|
| 10 | 12 | 6 | |
| 10 | 16 | 4 | |
| 11 | 12 | 3 | |
| 11 | 16 | 2 | |
| 12 | 12 | 1 | 4 RAM's remain available. |
| 12 | 16 | 1 | |

The four remaining available RAM's could be used, for example, as two 2 FIFO's, two 10-in, 12-out LUTS, or one 11-in, 12-out LUT. A single 10-in, 18-out LUT could also be constructed, leaving a single six-bit RAM available. This final remaining RAM would not be able to be used.

Figure 9:
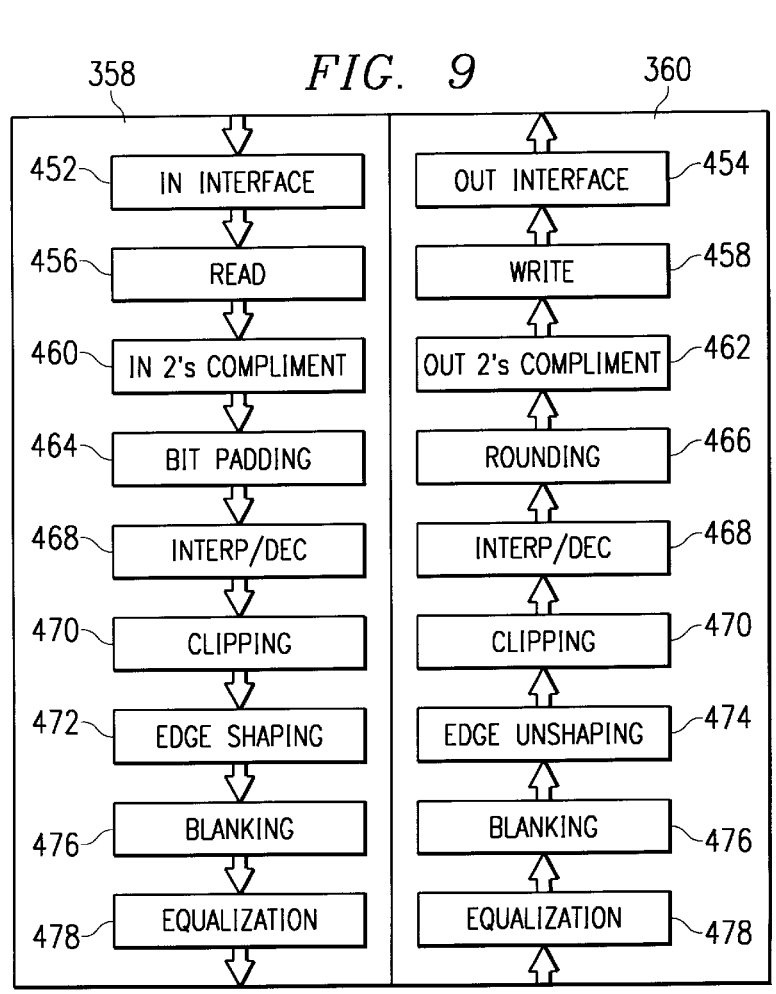
FIG. 9 illustrates how data flows through the input/output block of an MSIC according to one embodiment of the invention.

FIG. 9 illustrates how data flows through the input and output block 358, 360 and is denoted generally as 400. The first/final step is an input interface 452 and an output interface 454. The rest of the block is dedicated to pre/post-processing the stream to allow it's format to conform to various expectations.

If data entering MSIC 350 is digital ITU-601 format, the SAV/EAV codes are intercepted, and read ITU-601 456 generates horizontal and vertical blanking information to send along with the video stream. The 27 MHz data stream is broken into two 13.5 MHz streams. For a write ITU-601 458, this process is reversed. Any input data in offset binary format is converted to two's compliment format 460 for internal processing. At the interface output 454, the 2's compliment is converted back 462 to original form if required.

On input 452, data words are forced into the fractional bits of whatever numeric format is to be used. The integer and sign bits are zeroed. Any unused fractional bits can be padded 464 through several means: Zero-padding, one-half LSB padding, MSB padding, or padding with random numbers. If rounding 466 is required on the output interface 454, it can be accomplished through dynamic rounding, truncation, or adding one-half LSB.

Interpolation and decimation process 468 is the same for inputs 452 and outputs 454. The data stream can have linear interpolation or decimation 468 applied to convert between data formats. At this point, the input/output data stream can be clipped 470 to any arbitrary value, to insure that it meets with the requirements of whatever format is used.

Edge shaping 472 of incoming streams may have the first three pixels immediately before and after horizontal blanking 476 attenuated to ease edge-condition constraints for lowpass FIR filtering. This is accomplished by multiplying the first three pixels on a line by 0.25, 0.50, and 0.75, respectively. This is also applied to the last 3 pixels on a line, in reverse order. Un-shaping process 474 may also be performed at the output the same way the process was performed at the input or the process may be reversed by multiplying the three pixels in question by 4.00, 2.00, and 1.50.

The incoming video streams horizontal and vertical blanking regions may optionally, and independently, be forced to zero for both inputs or outputs. To ease the burden of macrocell equalization 428 at the input, and to provide properly equalized signals at the output, the equalization block 478 attempts to bring incoming/outgoing signals as closely together in time as possible.

FIG. 10A is a table illustrating MSIC 350 data format and is denoted generally as 500. Internally, numbers are represented in 16-bit fixed-point 2's compliment notation 502. Table 500 shows the values of bits at various positions in each of the three numeric formats 504 that MSIC 350 will support. The range 506 and precision 508 of each of the numeric formats is shown at the right of the table 500. A ±1.14 format has four decimal places of fractional precision 508, while the other formats have only three decimal places of fractional precision. The value of the least significant fractional bit for each of the formats are as follows: ±1.14= $0.000061=2^{-14}$, ±3.12=$0.000244=2^{-12}$, and ±5.10= $0.000976=2^{-10}$.

Normalized video information will be represented completely within the fractional bits. That is to say: Black to White maps 0.0000 to 0.9999. It is important to note that some constants and/or intermediate results may involve numbers that are substantially above or below the range 506 of normalized video. This is completely appropriate, and it is for this reason that MSIC 350 supports a variety of numeric formats that exceed normalized video range in both the positive and negative directions. If any particular addition or multiplication generates a result that overflows or underflows the numeric format being used, that result will clip to the highest or lowest number that is representable in that numeric format.

FIG. 10b illustrates the operation of the processor interface of MSIC 350 and is denoted generally as 420. MSIC 350 has a 14-bit address bus and an 8-bit bi-directional data bus, for a total footprint of 16K bytes. Of this, each of the 8 macrocells 352 consumes 64 bytes, for a total of 512 bytes. Another 512 bytes of various control registers 556 is possible, for a total of 1K bytes of control registers 556. There may be an additional 1K consumed for shadow registers 558. The twelve 1K×6-bit RAM's 560 are responsible for an additional 12K bytes of address space.

Reading and writing to MSIC 350 will be accomplished through the use of an SRAM-type interface 552: Chip Select, Output Enable, and Read/Write. In addition to these pins, there will also be an programmable interrupt output, driven from the video timing that is either generated by MSIC 350, or passing through it. In addition to these signals, there will also be pins to allow hardware reset, and to indicate the chip readiness state after a reset.

Processor interface 420 is responsible for configuring MSIC 350 upon reset. The remapping process 554 handles address and register remapping for configured versions of the chip. This is accomplished by storing an address alias table, a default values table, and a register bitmask restriction table in non-volatile RAM 560. Non-volatile memory is inaccessible by the user and contains a set of security bits that lock out access by the user to configuration registers. Upon reset, all registers in the chip reset to a known state. For unconfigured chips, the reset process is now complete, and direct access to all registers 556 and 558 and RAM's 560 is turned-over to the processor interface 406.

For configured chips, after reset, the Boot Procedure block 550 writes the default values to all registers in the MSIC 350 before the processor port 552 is allowed to function. For processor access to an arbitrary register address, the address is first mapped 554 through the address alias table to find the true address of the indicated register within MSIC 350. The bitmask restriction table indicates which bits of this register the processor may access. For writes, this bitmask allows any unauthorized bits to be replaced with default values before the actual write occurs. For reads, the bitmask restriction table allows any unauthorized bits to be zeroed-out before the information is output.

FIG. 11A illustrates the flow process through a RAM block 408 and is denoted generally as 414. Data flow can be explained for both LUT's and FIFO's individually. In either case, the input and output adjustment blocks alter the width of the stream through rounding and padding to accommodate the width of the LUT or FIFO.

When used as a FIFO, after the input data is adjusted 562, it is stored in a RAM of RAM array 564 at the address generated by the FIFO controller 566, located in the Address Generation section 566. The Address Generation section 566 also controls reading the data out 568 of the FIFO at the appropriate time. Finally, the width of the output data is adjusted back to the 16-bit format expected within the chip 570.

When used as a LUT, after the incoming data is adjusted 562, it is passed to the Address Generation section 566 for use as the address to a RAM in RAM array 564. When the LUT is more than 10-bits deep, several RAM's will get the same address, and the appropriate output is selected by the Output Selection section 568 using the upper address bits from the Address Generation section 566 as the selection criteria. Finally, the output data is adjusted back 570 to the 16-bit format expected within the chip.

FIG. 11B illustrates how data handling problems are solved and is denoted generally as 600. There are two data handling problems that are closely intertwined, that are solved via the RAM FIFO facility 602. These issues are Ancillary data handling, and handling edge conditions for FIR filters. Ancillary data 604 occurs during the horizontal and vertical blanking intervals of ITU-601 video. FIR filters are susceptible to ringing caused by high-frequency components in the sharp transition between blanking and active video data 606. This problem can be solved by padding the blanking region with the edge pixels from the active video portion of the signal.

If the video signal contains ancillary data 604, the padding process can overwrite ancillary data 604 information in the blanking interval. It is undesirable for ancillary data 404 to be processed within the macrocells 352, since it typically contains encoded information that would become invalid if scaling or offset were applied. Once ancillary data 604 bypasses the macrocell array 354, the data is then re-equalized to the video stream by the next FIFO 602 in a multi-line filtering application. For applications where only a single line is used, or filtering is not performed, the ancillary data can be re-equalized using the FIFO's in the input and output blocks.

This separation between the active video pixels 606 and the ancillary data 604 also allows padding to the blanking region in-between FIFO stages. Eeach time the video data re-enters the FIFO 602, the padding information could be lost by overwriting it with ancillary data 604, so the padding is recalculated at each stage. Since the FIFO 602 is buffering a line, determining the value of the first pixel on a line "before" it actually occurs is trivial. Replicating the last pixel on a line is also trivial. There may or may not be a limited facility to perform a similar function in the vertical direction, but this has not been conclusively determined.

What is claimed:

1. A integrated circuit signal processing device comprising:
    a nonvolatile memory means for storing a plurality of configuration parameters;
    a processing means coupled to said nonvolatile memory means and consisting of:
        means for equalizing incoming streams of data in time to create synchronized signals, said means comprising at least one input terminal for receiving said streams and at least one output terminal at which said synchronized signals are presented;
        a set of interconnected arithmetic logic units communicably coupled to said output terminal for receiving said synchronized data; and
        a set of configuration registers accessible by said arithmetic logic units, wherein the data in said configuration register determines the functionality of said interconnected logic units.

2. The device according to claim 1 wherein said means for equalizing automatically detects the difference in time between any two or more of said incoming streams of data.

3. The device according to claim 2 wherein said means of equalizing is further configured to automatically compensate for said difference in time between said two or more data signals.

4. The device according to claim 1 wherein said nonvolatile memory means contains a set of security bits that can selectively lock out access by a user to said configuration registers.

5. The device according to claim 1 wherein said nonvolatile memory means comprise a set of mapping aliases which defines the addresses at which a user accesses each of said configuration parameters.

6. The device according to claim 4 wherein each of said configuration registers can be restricted on a bit wise basis.

7. The device according to claim 1 wherein each of said configuration registers are loaded with configuration parameters upon reset.

8. The device according to claim 1 wherein each of said configuration registers are loaded with configuration parameters upon power-up.

9. The device according to claim 3 wherein said means for equalizing may be configured as a set of equalization RAMs.

10. The device according to claim 3 wherein said means for equalizing may be configured as a set of FIFO's.

11. The device according to claim 1 wherein said interconnected arithmetic logic units comprised of two adders and a multiplier used to perform a selective set of arithmetic operations on said synchronized signals.

12. A reconfigurable real time digital processing circuit comprising:
    a plurality of interconnected macrocells, each of said macrocells comprising;
        a means of equalizing incoming data streams received by the circuit; and
        a plurality of arithmetic logic units coupled to said means of equalizing for receiving synchronized data therefrom;
    a support block coupled to said plurality of interconnected macrocells, said support block providing interface between the processing circuit or and one or more external systems which deliver said incoming data streams;
    an input block coupled to said plurality of interconnected macrocells for receiving digital data from and external source;
    an output block coupled to said plurality of macrocells for transmitting processed information to at least one of said external systems.

13. The real time digital processor according to claim 12 wherein each of said plurality of interconnected macrocells further comprises a processing block used for equalizing said streams of incoming digital data.

14. The real time digital processor according to claim 12 wherein each of said plurality of interconnected macrocells comprises a universal set of memory registers used to control the operation of said macrocells.

15. The real time digital processor according to claim 12 wherein said macrocell comprises two adders and a multiplier configured to perform a selective set of arithmetic operations on incoming digital data.

16. The real time digital processor according to claim 12 wherein the outputs of macrocells are coupled to input of succeeding macrocells.

17. The real time digital processor according to claim 12 wherein said support block provides a means of generating a set of synchronization signals.

18. The real time digital processor according to claim 12 wherein said set of synchronization signals are used to equalize input signals entering said macrocells.

19. The real time digital processor according to claim 12 wherein said support block provides a means for calculating statistical data such as min, max, mean, etc., on said incoming stream.

20. The real time digital processor according to claim 12 wherein said support block provides a means for said external systems to read the contents of said control registers.

21. An integrated circuit for processing a plurality of multiple-bit data signals, comprising:
    a plurality of input terminals for receiving respective ones of the data signals;
    a plurality of output terminals;
    a variable delay buffer coupled to the input terminals for receiving the data signals; and
    logic circuitry coupled to the variable delay buffer for selectively delaying the data signals to equalize the data signals in time with respect to each other, thereby producing equalized data signals, the output terminals coupled to the variable delay buffer for presenting the equalized data signals.

22. The integrated circuit of claim 21, wherein the logic circuitry is capable of offsetting the data signals by a fixed amount in time.

* * * * *